United States Patent
Schwartz

(10) Patent No.: US 10,172,493 B2
(45) Date of Patent: Jan. 8, 2019

(54) WATERMELON SLICER

(71) Applicant: Daniel Schwartz, Horseheads, NY (US)

(72) Inventor: Daniel Schwartz, Horseheads, NY (US)

(73) Assignee: Daniel Schwartz, Horseheads, NY (US)

(*) Notice: Subject to any disclaimer, the term of this patent is extended or adjusted under 35 U.S.C. 154(b) by 0 days.

(21) Appl. No.: 15/682,197

(22) Filed: Aug. 21, 2017

(65) Prior Publication Data

US 2018/0020862 A1 Jan. 25, 2018

Related U.S. Application Data

(63) Continuation of application No. 15/611,059, filed on Jun. 1, 2017, now Pat. No. 9,986,866, which is a continuation of application No. 13/795,915, filed on Mar. 12, 2013, now Pat. No. 9,693,648, which is a continuation-in-part of application No. 13/659,162, filed on Oct. 24, 2012.

(51) Int. Cl.
| | |
|---|---|
| A47J 17/00 | (2006.01) |
| B26D 1/553 | (2006.01) |
| A47J 43/28 | (2006.01) |
| B26D 3/26 | (2006.01) |

(52) U.S. Cl.
CPC ............... *A47J 17/00* (2013.01); *A47J 43/28* (2013.01); *B26D 1/553* (2013.01); *B26D 3/26* (2013.01)

(58) Field of Classification Search
CPC ............. B26D 1/553; B26D 3/26; A47J 43/28
See application file for complete search history.

(56) References Cited

U.S. PATENT DOCUMENTS

| | | | |
|---|---|---|---|
| 590,129 A | 9/1897 | Bulette | |
| 726,707 A | 4/1903 | Lavender | |
| 1,399,950 A | 12/1921 | Fish | |
| 1,422,066 A | 7/1922 | Vafiades | |
| 1,744,422 A | 1/1930 | Taylor | |
| 2,403,190 A | 7/1946 | Parraga | |
| 2,505,917 A * | 5/1950 | Schumacher | A47J 17/04 30/113.3 |
| 2,550,166 A | 4/1951 | Sargent | |
| 2,629,168 A | 2/1953 | Shpentuck | |
| 2,679,688 A | 6/1954 | Buschman | |
| 2,802,266 A | 8/1957 | Huxhold | |

(Continued)

FOREIGN PATENT DOCUMENTS

| | | |
|---|---|---|
| JP | 2003093763 A | 4/2003 |
| JP | 201042938 A | 7/2010 |

OTHER PUBLICATIONS http://www.mastgeneralstore.com/products/id-33297/pineapple_cutter_corer; Pineapple Cutter & Corer; 2 pgs. Copyright 2017; accessed on Jun. 7, 2017.

(Continued)

*Primary Examiner* — Omar Flores Sanchez

(74) *Attorney, Agent, or Firm* — Tucker Ellis LLP; Ross Kowalski; Carlos Garritano

(57) ABSTRACT

A slicer device and a method of using a slicer device for slicing and removing a fleshy part of a watermelon surrounded by a rind. The device includes an elongated handle and a scraper head with a scraping portion having at least one scraping edge configured to follow the contour of the watermelon while scraping the fleshy interior of the watermelon.

14 Claims, 25 Drawing Sheets

(56) References Cited

U.S. PATENT DOCUMENTS

| | | |
|---|---|---|
| 2,824,588 A | 2/1958 | Lyon |
| 3,060,838 A | 10/1962 | Priore |
| 3,596,354 A | 8/1971 | Emerson |
| 3,933,315 A | 1/1976 | Popeil |
| 4,383,365 A | 5/1983 | Metzigian |
| 4,436,025 A | 3/1984 | Jones |
| 4,490,912 A | 1/1985 | Hirano |
| 4,546,545 A | 10/1985 | Hirano |
| 4,571,832 A | 2/1986 | Hendy et al. |
| 4,646,602 A | 3/1987 | Bleick |
| 5,121,679 A | 6/1992 | Mertz |
| 1,436,236 A | 11/1992 | Cartuschka |
| 5,207,137 A | 5/1993 | Baril |
| 5,228,397 A | 7/1993 | Plant |
| 5,313,707 A | 5/1994 | Tarafdar |
| 5,337,480 A | 8/1994 | Codikow |
| 5,363,756 A | 11/1994 | Muro |
| 5,373,781 A | 12/1994 | Knasel |
| 5,421,249 A | 6/1995 | Repisky et al. |
| 5,520,105 A | 5/1996 | Healy |
| D375,661 S | 11/1996 | Ross |
| 5,930,901 A * | 8/1999 | Gerhardt ............ A47J 17/00 30/116 |
| 5,937,524 A | 8/1999 | Hornsby |
| 6,052,910 A | 4/2000 | Kaebisch, Jr. |
| 6,502,490 B1 | 1/2003 | Krawick |
| 6,647,848 B1 | 11/2003 | Bruner |
| 6,748,854 B2 | 6/2004 | Barnard |
| 6,789,468 B2 | 9/2004 | Rosen |
| D550,521 S | 9/2007 | Roberson |
| 7,263,776 B1 * | 9/2007 | Shieh ............ A47J 25/00 30/279.6 |
| D586,628 S | 2/2009 | Bevers |
| 7,568,414 B2 | 8/2009 | Farid et al. |
| 7,581,491 B2 | 9/2009 | Ascari et al. |
| 7,870,812 B2 | 1/2011 | Chiu |
| D650,246 S | 12/2011 | Harris et al. |
| D650,247 S | 12/2011 | Harris et al. |
| 8,146,468 B1 | 4/2012 | Kachelries |
| 8,205,545 B2 | 6/2012 | Heck et al. |
| 8,286,355 B2 | 10/2012 | Aby-Eva |
| D687,267 S | 8/2013 | Harris et al. |
| D690,170 S | 9/2013 | Harris et al. |
| 8,584,366 B2 | 11/2013 | Wedderburn |
| 2004/0025651 A1 | 2/2004 | Bachman et al. |
| 2004/0211069 A1 | 10/2004 | Tuttle |
| 2008/0168660 A1 | 7/2008 | Chiu |
| 2010/0212517 A1 | 8/2010 | Nuri |
| 2011/0094394 A1 | 4/2011 | Tateno |
| 2011/0296695 A1 | 12/2011 | Temiz |

OTHER PUBLICATIONS

International PCT Search Report for PCT/US2013/066515; dated Feb. 7, 2014; 22 pages.
The Ultimate Commercial Melon Cuber; http://www.meloncuber.com/ at least as early as Jul. 2012; 2 pages.
Solutions Products that make life easier; Melon Cutter—Neat, uniform melon slices with just one swipe; http://www.solutions.com; at least as early as Jul. 2012; 1 page.
Williams-Sonoma; Stainless-Steel Pineapple Slicer & Dicer; http://www.williams-sonoma.com/products/stainless-sell-pineapple-slicer-dicer; at least as early as Jul. 2012; 3 pages.

* cited by examiner

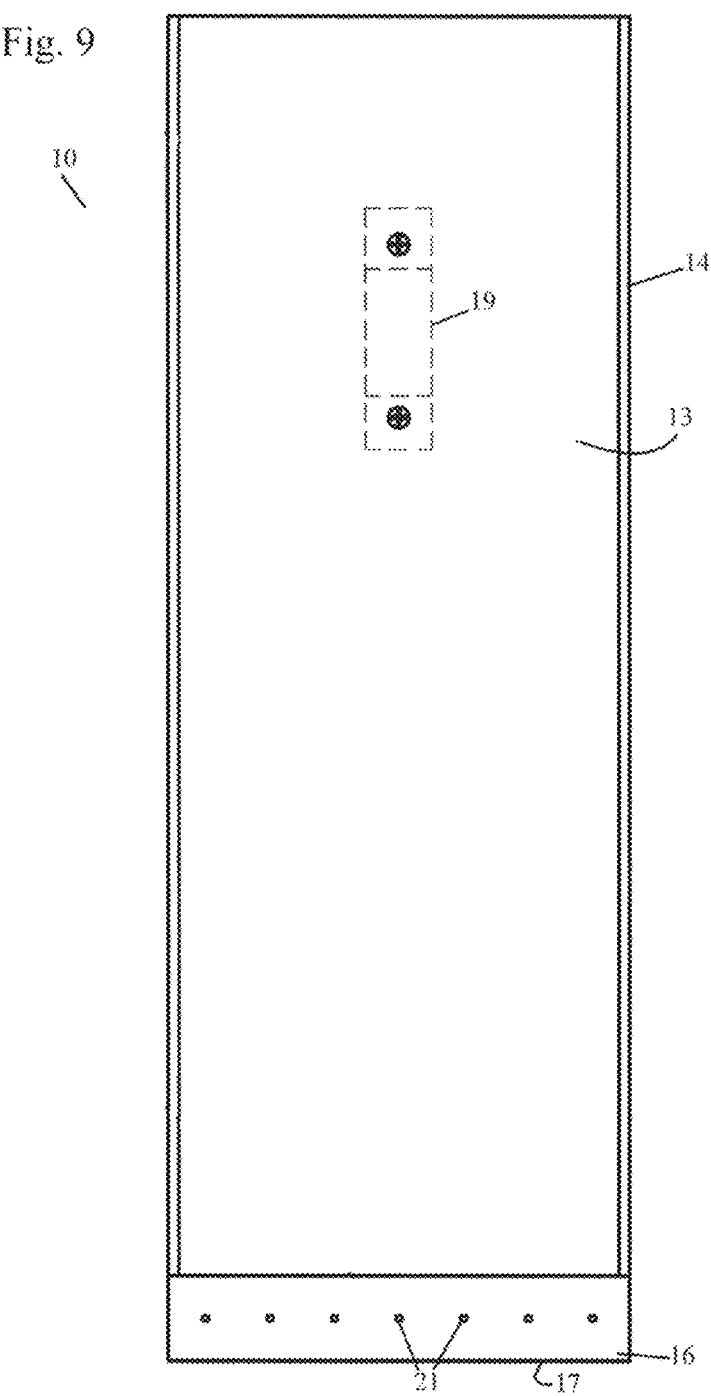

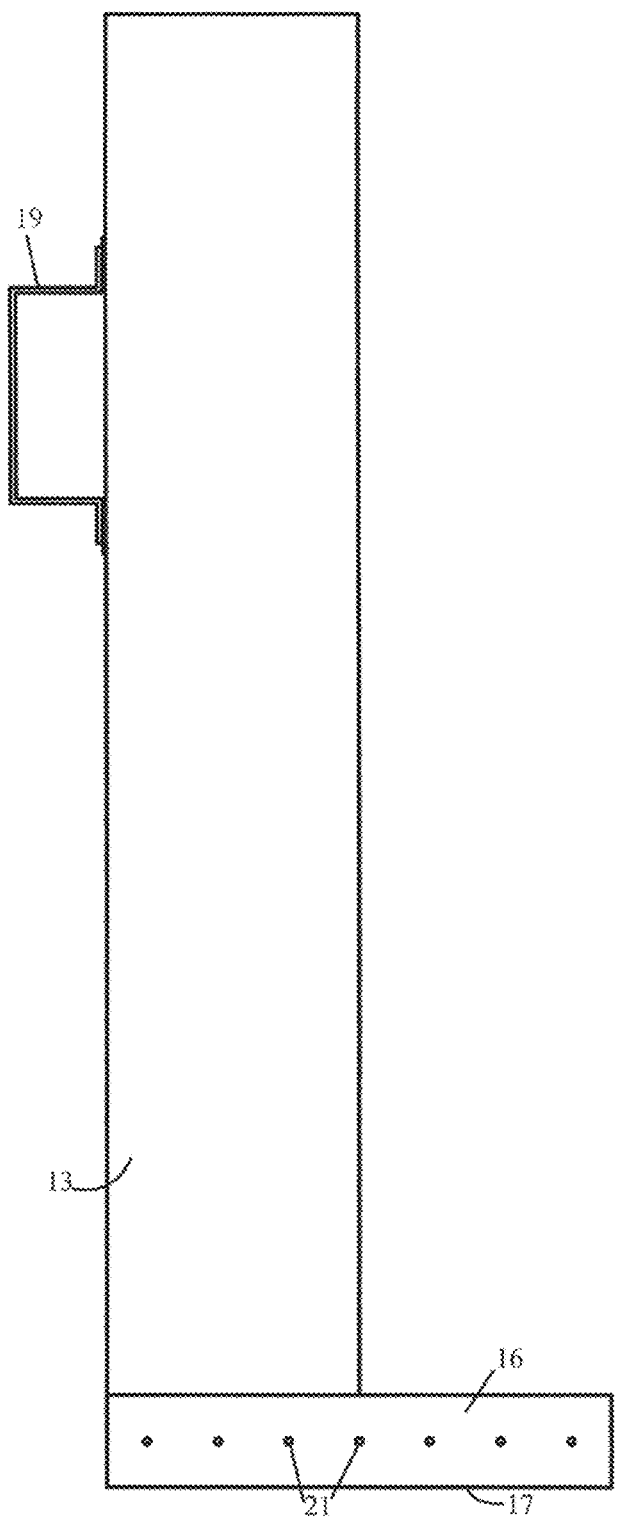

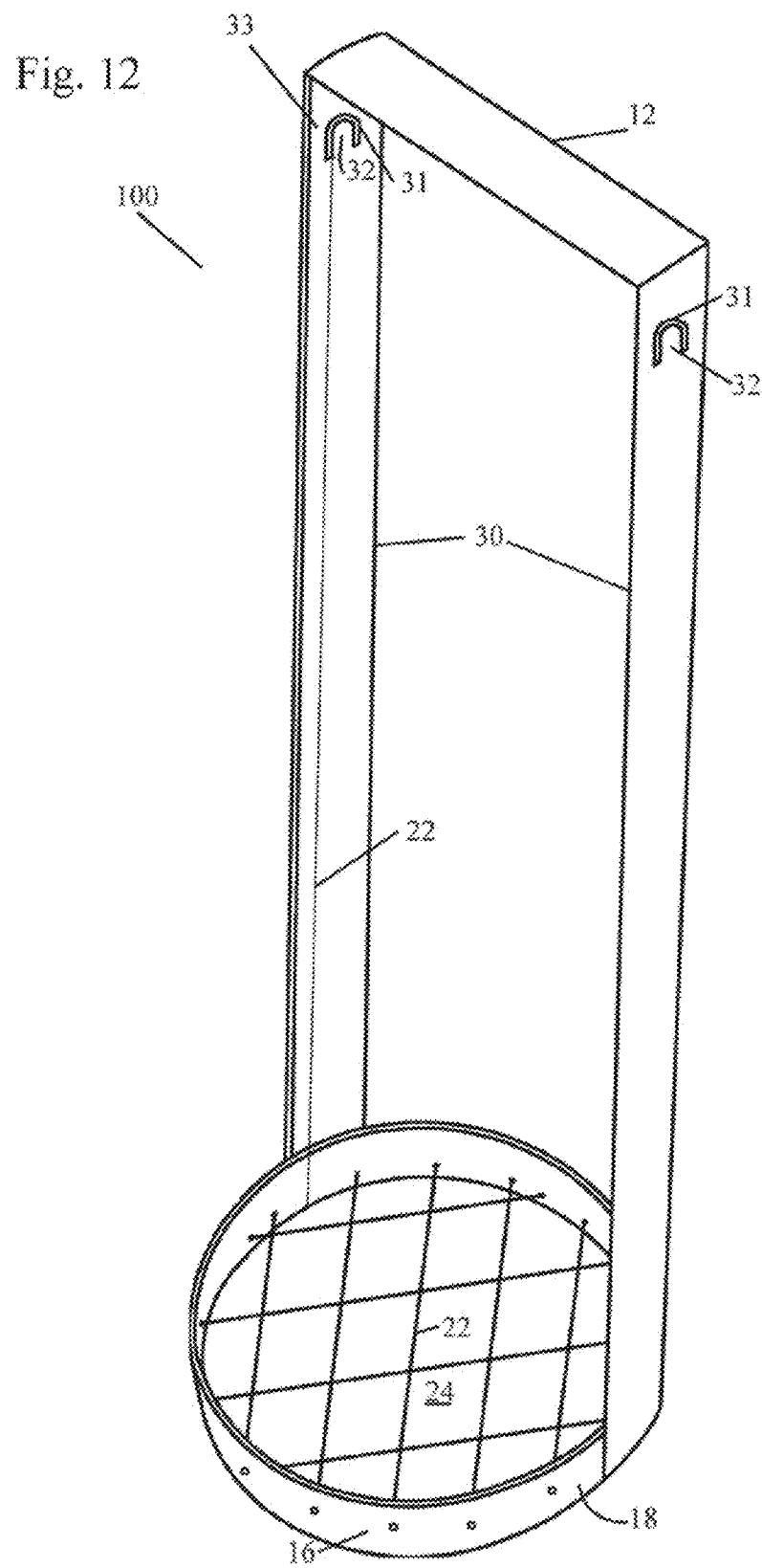

WATERMELON SLICER

REFERENCE TO RELATED APPLICATIONS

This is a continuation of application Ser. No. 15/611,059 filed on Jun. 1, 2017 entitled "Watermelon Slicer", which claims the benefit of and is a continuation of application Ser. No. 13/795,915 filed on Mar. 12, 2013 entitled "Watermelon Slicer", which claims the benefit of and is a continuation-in-part of application Ser. No. 13/659,162, filed Oct. 24, 2012, and is entitled "Watermelon Slicer". The aforementioned applications are hereby incorporated herein by reference.

BACKGROUND OF THE INVENTION

Field of the Invention

The invention pertains to the field of food slicers. More particularly, the invention pertains to a watermelon slicer.

Description of Related Art

Slicers of vegetables and fruit have been used in the past to ease the removal of the edible portion of the vegetable or fruit for consumption by a user. For example, U.S. Pat. No. 4,546,545, entitled, "Pineapple Cutter" by Hirano discloses a pineapple cutter with a cylindrical body having a cutting edge at the surface end of the lower portion, a pair of 15 handles connected to the outer surface of the cylindrical body, a pressing sheet mounted on the inner portion of the cylindrical body slidable in the vertical direction and a pushing member secured to the upper portion of the cylindrical body connected with the pressing sheet. A second pressing sheet with a smaller diameter than the pressing sheet is located within the pressing sheet to core the pineapple. When used to cut the pineapple, the rind is removed at the same time the core of the pineapple is removed. The exposed cutting edges of U.S. Pat. No. 4,546,545 cause user safety risk. U.S. Pat. No. 4,546,545 could even be seen as an ejector assembly to deal with the obvious difficulty of removing pineapple from the cutter device of Hirano's U.S. Pat. No. 4,490,912. U.S. Pat. No. 1,744,422, entitled "Fruit and Vegetable Cutter" by Taylor discloses a handle with detachable cutting head. The detachable cutting head is attached to the handle and a funnel type cylindrical portion with through threads. This cutter dices the entire vegetable or fruit including the outside skin. This cutter could not be used for a watermelon for example, because to push the cutter inside of the watermelon flesh, the screw thread connection would be too thick and additionally the holder around the funnel portion of the cutter would also not be able to be pushed through the watermelon flesh. Furthermore, the cutter can only accommodate items which fit entirely within the cutting circle.

U.S. Pat. No. 4,490,912, entitled "Pineapple Cutter" by Hirano discloses a pineapple cutter with handles attached to a cylinder which has a cutter portion. The cylinder of the pineapple cutter is adapted to punch the outer peel and the interior of the pineapple to separate the peel from the interior of the pineapple. The pineapple cutter cuts into the outer peel of the pineapple in order to separate it from the interior of the pineapple. Furthermore, based on the design and the need to "punch" the pineapple cutter through the pineapple in order to slice it, softer flesh, such as the interior of a watermelon would be significantly damaged in the process of removing the flesh from the cutter assembly as described in this patent.

Therefore, there is a need for a watermelon slicer that can remove the fleshy interior or meat of the watermelon without cutting into the rind.

SUMMARY OF THE INVENTION

A slicer device and a method of using a slicer device for slicing and removing a fleshy part of a watermelon surrounded by a rind. The device includes a cutter piece, a plurality of cutters and at least one support bar attached to an outer surface of the cutter piece. The cutter piece has an outer surface and an inner surface defining an interior for receiving the fleshy part of the watermelon. The plurality of cutters are within the interior of the cutter piece arranged to form a pattern with a plurality of openings, with each of the openings being defined between cutters or between at least one cutter and the inner surface 25 of the cutter piece, such that the fleshy part of the watermelon within the rind is cut into multiple pieces with geometric shapes.

BRIEF DESCRIPTION OF THE DRAWING

FIG. 9 shows a front view of a handle coupled to a slicer device.

FIG. 10 shows a side view of a handle coupled to a slicer device.

FIG. 11A Shows using the slicer device with the cutters arranged in a grid to remove a fleshy part of watermelon. FIG. 11B shows pushing the slicer into the fleshy part of the watermelon. FIG. 11C shows rotating the slicer within the fleshy part of the watermelon. FIG. 11D shows removing the fleshy part of the watermelon with removal of the slicer device.

FIG. 12 shows a slicer device with a wire tensioning mechanism of a slot.

FIG. 18A shows aligning the slicer above the fleshy part of the watermelon. FIG. 18B shows pushing the slicer into the fleshy part of the watermelon. FIG. 18C shows aligning the indexer paddle with the middle slot of the fleshy part of the watermelon created in FIG. 18B. FIG. 18D shows pushing indexer paddle within the fleshy part of the watermelon until the rotation plate is touching the watermelon. FIG. 18E shows rotating the slicer, for example a quarter turn, while holding the rotation plate stationary. FIG. 18F shows lifting the indexer paddle up one level, and then lifting the slicer up one level, while holding the rotation plate stationary. FIG. 18G shows rotating the slicer back a half turn, while holding the rotation plate stationary. FIG. 18H shows lifting the Indexer paddle relative to the rotation plate so that the slicer can then be lifted to a second level below the rotation plate. FIG. 18I shows rotating the slicer at the second level, while holding the rotation plate stationary. FIG. 18J shows lifting the indexer paddle relative to the rotation plate, so that the slicer can be lifted to a third level below the rotation plate. FIG. 18K shows rotating at a third level, while holding the rotation plate stationary at the third level. FIG. 18L shows removing the slicer and the rotation plate with an indexer paddle from the cubed fleshy part of the watermelon.

FIG. 19A shows a schematic of a slicer wrench. FIG. 19B shows using the slicer wrench with a watermelon and slicer.

FIG. 20A shows a schematic of a slicer strap. FIG. 20B shows using the slicer strap to mobilize a watermelon.

FIG. 21A shows a schematic of a melon holder. FIG. 21B shows using the melon holder to mobilize a watermelon.

DETAILED DESCRIPTION OF THE INVENTION

Figure 1:
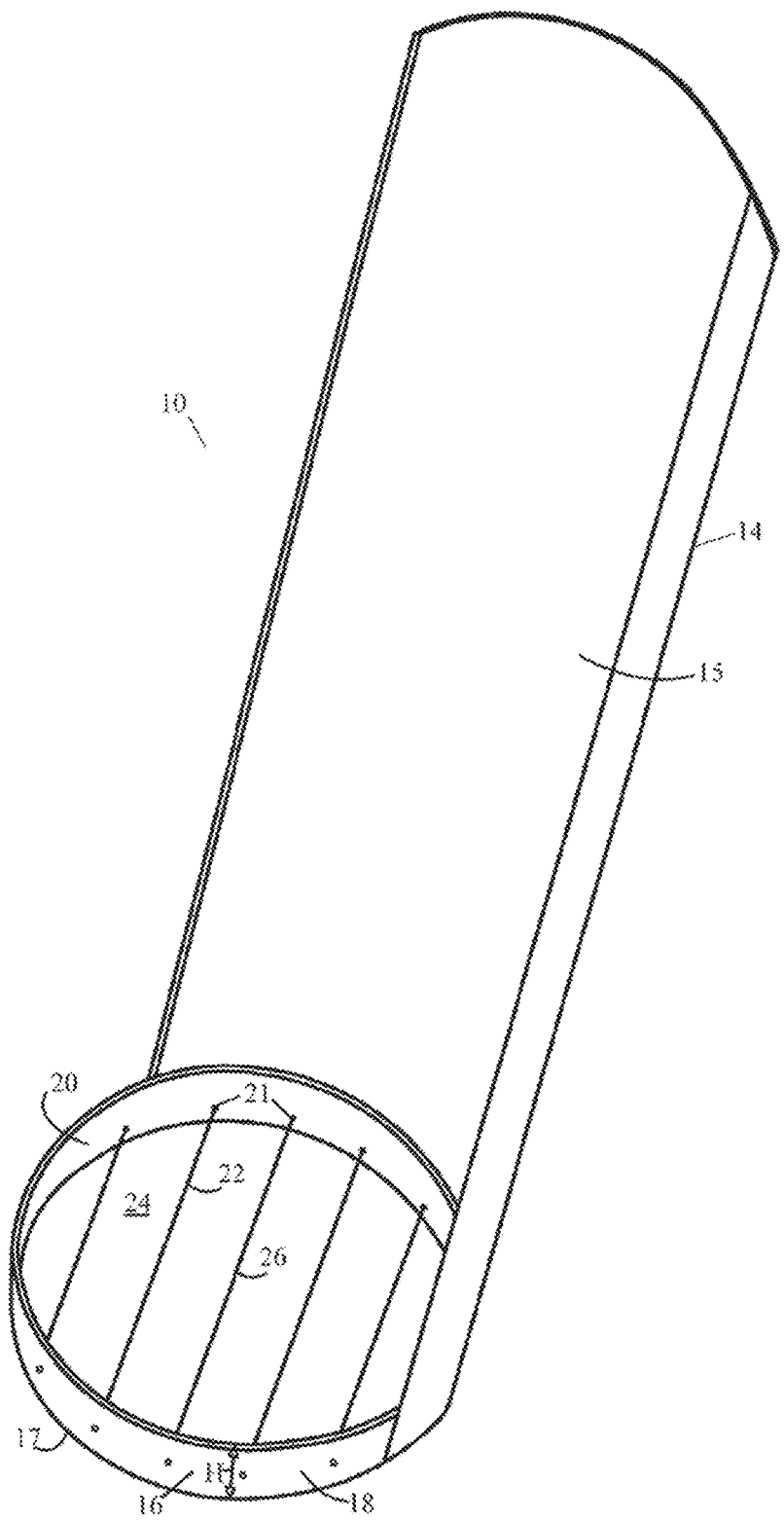
FIG. 1 shows a slicer device with cutters arranged in parallel.

FIGS. 1-11D and 18A-18L show a slicer device of a first embodiment. The slicer device 10 has a cutter piece 16 with an outer surface 18 and an inner surface 20. The cutter piece has a height H. Attached to the inner surface 20 of the cutter piece 16 is at least one cutter. The cutter may be at least one wire 22 with a cutting edge 17 of itself or at least one cutter blade with a cutting edge as in U.S. application Ser. No. 13/659,162, which is hereby incorporated by reference. The at least one cutter blade has a height h that is equal to the height H of the cutter piece.

Figure 6:
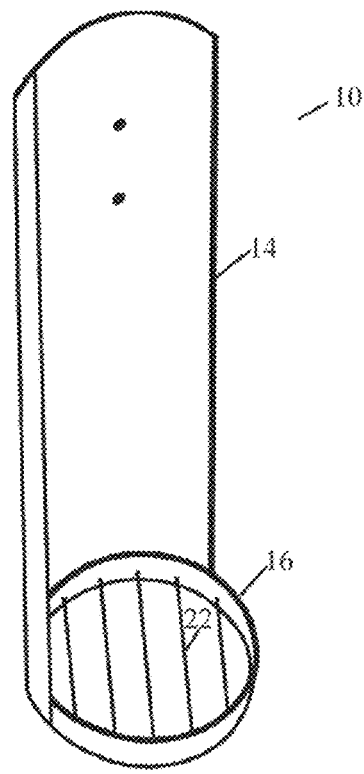
FIG. 6 shows the slicer device with cutters arranged in parallel after the fleshy part of the watermelon has been cut.
Figure 7:
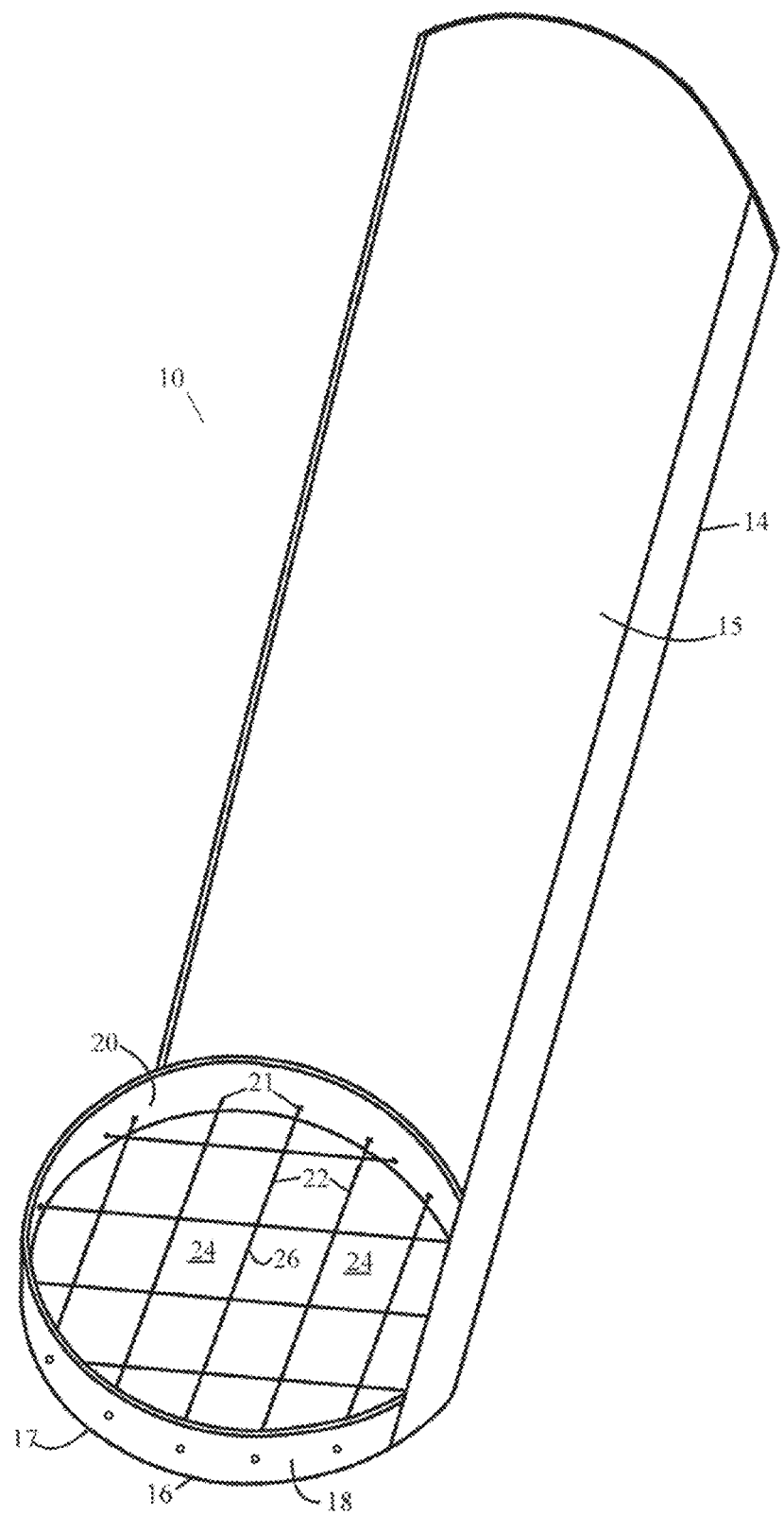
FIG. 7 shows an example of a slicer device with cutters arranged in a grid.
Figure 8:
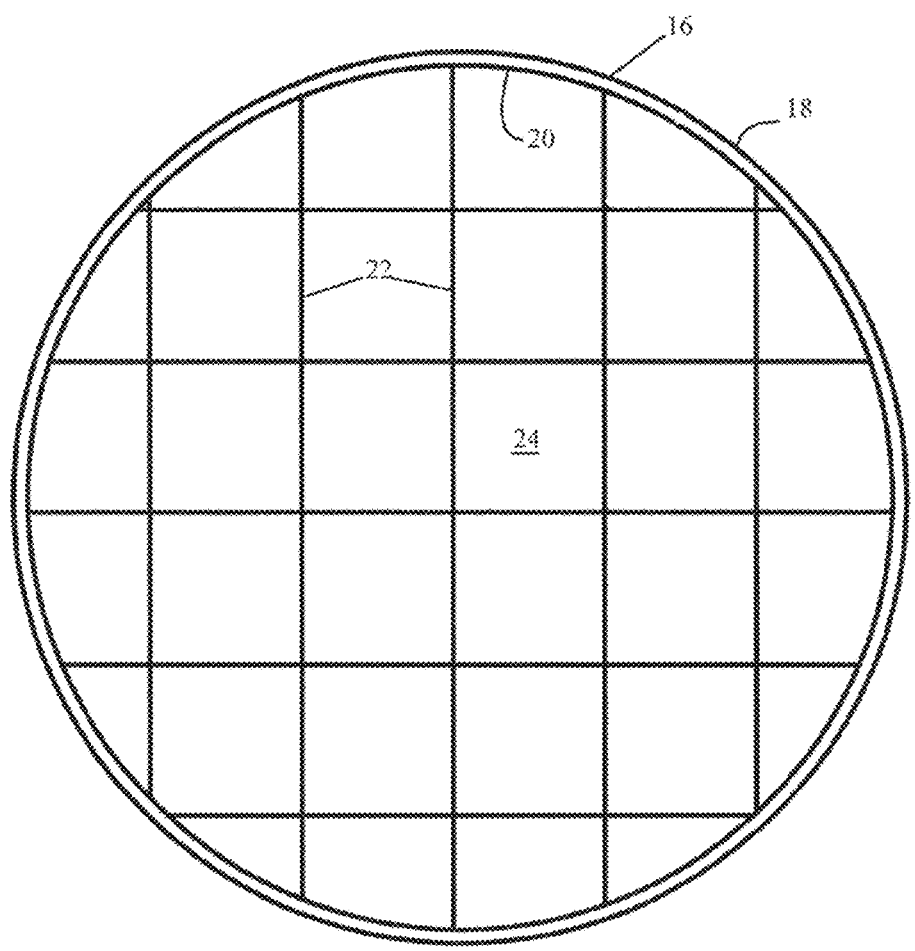
FIG. 8 shows a close-up of the cutters in a grid.

As shown in FIG. 1, the at least one wire 22 is arranged within the inner surface 20 of the cutter piece 16 to define openings 24 between the wires 22. The pattern of openings 24 and the at least one wire 22 is not limited to the patterns shown. The at least one wire 22 may be threaded through holes 21 or slots in the cutter piece 16 and may be arranged in parallel as shown in FIGS. 1-6 and 18A-18L or in a grid as shown in FIGS. 7-8 and 11. The ends of the at least one wire may be secured to the cutter piece 16 or the support bar 14 and/or tensioned through a tensioning and attachment mechanism 33 discussed below. It should be noted that the shape of the openings 24 defines the shape into which the watermelon meat or fleshy part 7 will be sliced into.

A support bar 14 is attached to an outer surface 18 of the cutter piece 16. The support bar 14 is preferably curved within an inner surface 15 and an outer surface 13. The curve of the inner and outer surface 15, 13 follow the curve the outer surface 18 of the cutter piece 16. The support bar 14 may also serve as a handle for a user and a scoop after the fleshy part 7 of the watermelon 2 has been removed for example as shown in FIG. 11D.

A handle 19 may be coupled to the outer surface 13 of the support bar 14 of the slicer device 10. The handle 19 may be coupled to the support bar 14 through welding or through fasteners, such as screw or rivets. While the handle 19 is shown as being parallel to the support bar 14, the handle 19 may be placed in any position relative to the support bar 14.

Figure 17:
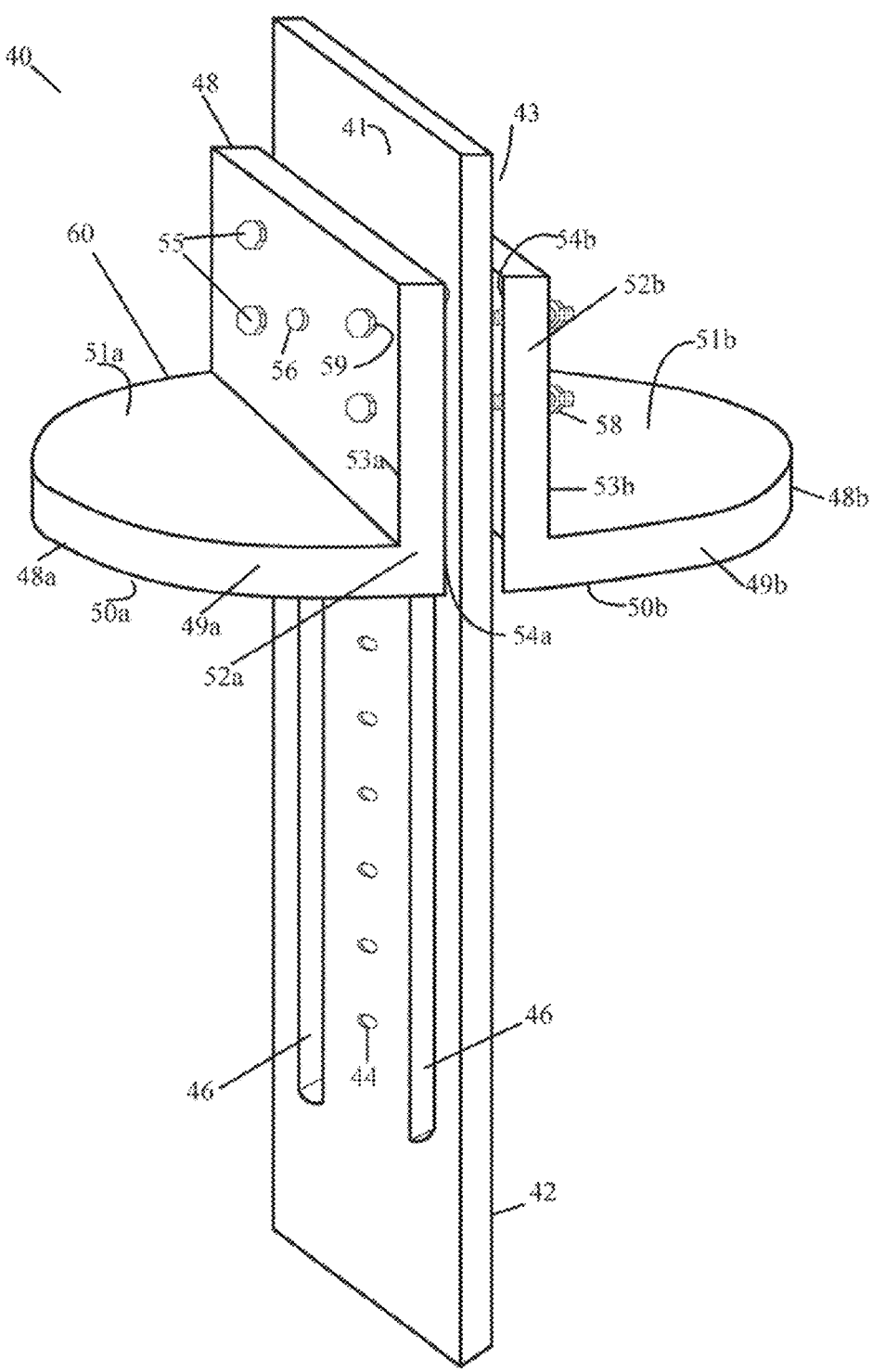
FIG. 17 shows a schematic of a rotation plate and indexer paddle.

FIG. 17 shows a device 40 that may be used with the slicer device 10. The device 40 includes an indexer plate 42 with a first side 41 and a second side 43, with the second side 43 opposite the first side 41. The first and second sides 41, 43 each have two channels 46 on either side of a set of spaced apart holes 44 along at least a portion of the length of the indexer paddle 42. The two channels 46 and the spaced apart holes 44 between the two channels 46 extend from the first side 41 to the second side 43. Attached to the first and second sides 41, 43 of the indexer paddle 42 are identical L-shaped brackets 48, indicated by reference numbers 48a and 48b and form the rotation plate 60 of the device 40. Each L-shaped bracket 48a, 48b has a semi-circular portion 49a, 49b connected to a wall portion 52a, 52b at a right angle. The semi-circular portion 49a, 49b has a top surface 51a, 51b and a bottom surface 50a, 50b which would contact the fleshy part of the watermelon 2. The wall portion 52a, 52b has an outer surface 53a, 53b and an inner surface 54a, 54b. The inner surface 54a, 54b contacts the first and second sides 41, 43 of the indexer paddle 42. The wall portion 52a, 52b also has holes 59 for receiving fasteners 55 and a spring biased pin 56. The L-shaped brackets 48a, 48b are attached to the indexer paddle 42 through fasteners 55 received by the wall portions 52a, 52b of both L-shaped brackets that pass through the channels 46 of the indexer paddle 42. In other words, fasteners 55 pass through the holes 59 in the wall portion 52a of a first bracket 48a, through the channel 46 of the indexer paddle 42 and are received by the holes 59 of the wall portion 52b of the second bracket 48b. The fasteners 55 may be held in place by nuts 58. Also received within one of the wall portions 52a, 52b is a spring biased pin 56. The spring biased pin 56 engages the central set of spaced apart holes 44. The spring biased pin 56 ratchets with the holes 44 to allow the L-shaped brackets 48a, 48b which form the rotation plate 60 to be moved up and down relative to the indexer paddle 42 or conversely the indexer paddle 42 moved up and down relative to the L-shaped brackets 48a, 48b.

Figure 2:
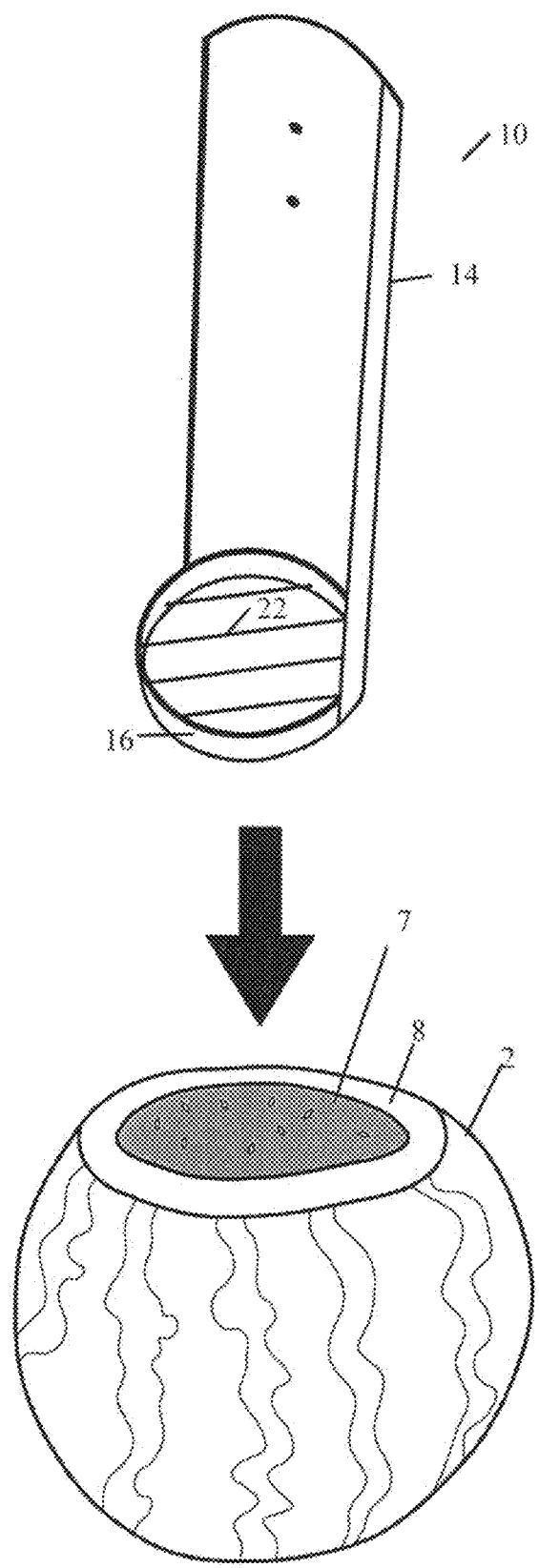
FIG. 2 shows using the slicer device with the cutters arranged in parallel to remove a fleshy part of watermelon by aligning the slicer with the fleshy part of the watermelon.
Figure 3:
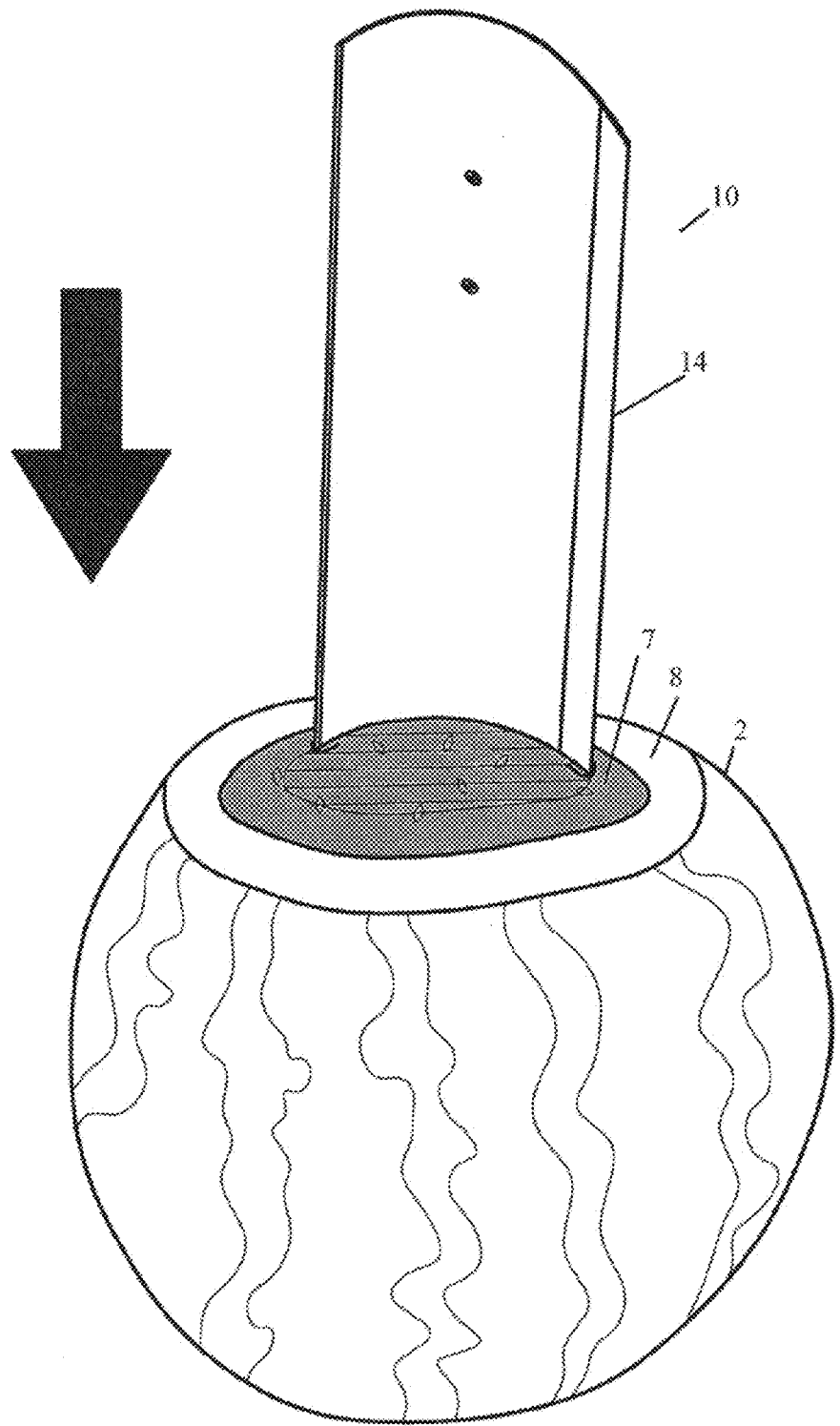
FIG. 3 shows pushing the slicer device with the cutters arranged in parallel into the fleshy part of the watermelon.

FIGS. 2-6 show steps of using the slicer device 10 with wires or cutters 22 arranged in parallel to remove the fleshy interior part or meat 7 of the watermelon 2 from the rind or outer portion 8 of the watermelon. In a first step, the user removes a top crown portion from the watermelon 2. As shown in FIG. 2, the crown of the watermelon has already been removed. The user then aligns the cutter piece 16 of the slicer device 10 with the fleshy part or meat 7 of the watermelon 2 as shown in FIG. 2. The user then pushes the slicer device 10 down into the fleshy part or meat 7 of the watermelon 2 using the support bar 14 or additional handle 19 as shown in FIG. 3 until the cutter piece 16 reaches a bottom or end of the fleshy part 7 of the watermelon 2 and the user can feel resistance against the firmer internal part of the watermelon rind 8.

Figure 4A:
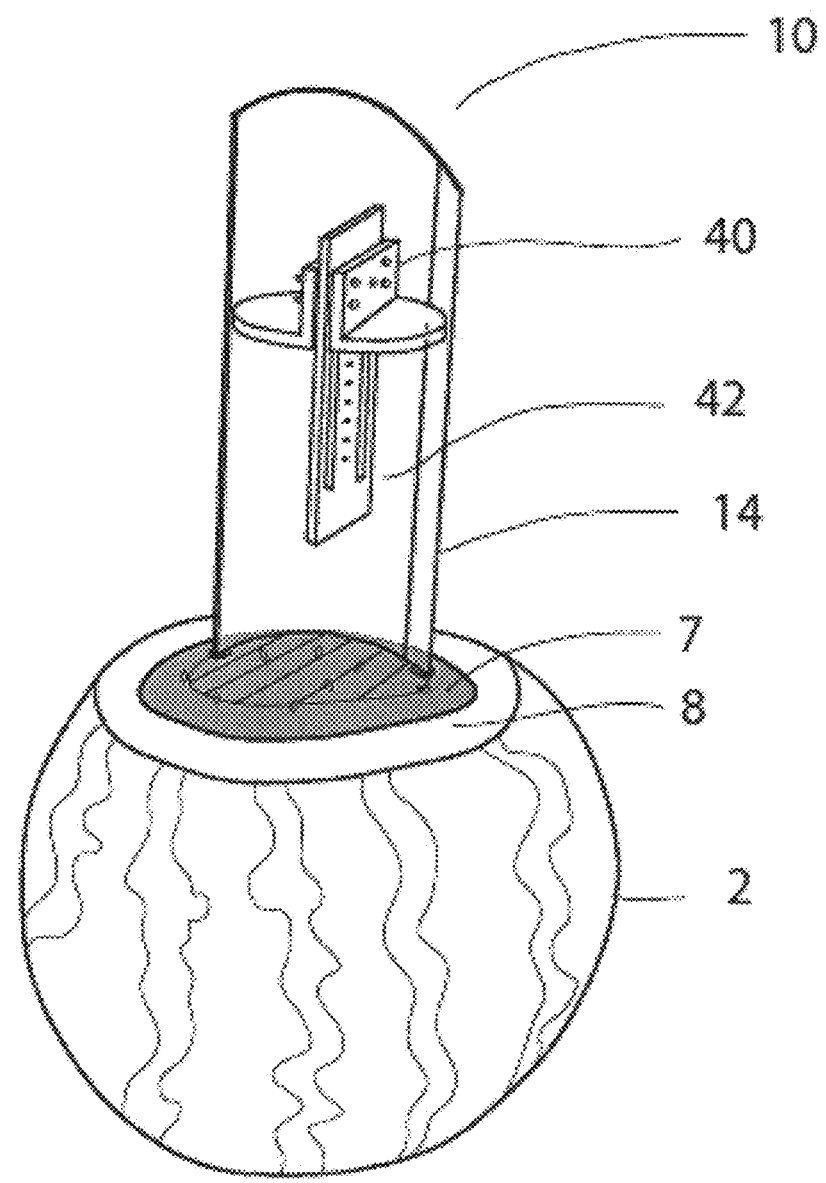
FIG. 4a shows a rotation plate against the slicer device with the cutters arranged in parallel with the new cuts made in the fleshy part of the watermelon.

In FIG. 4A, the user prepares to insert the indexer paddle 42 of the device 40 in the middle slot made in the meat 7 of the watermelon 2 by the slicer device 10.

Figure 4B:
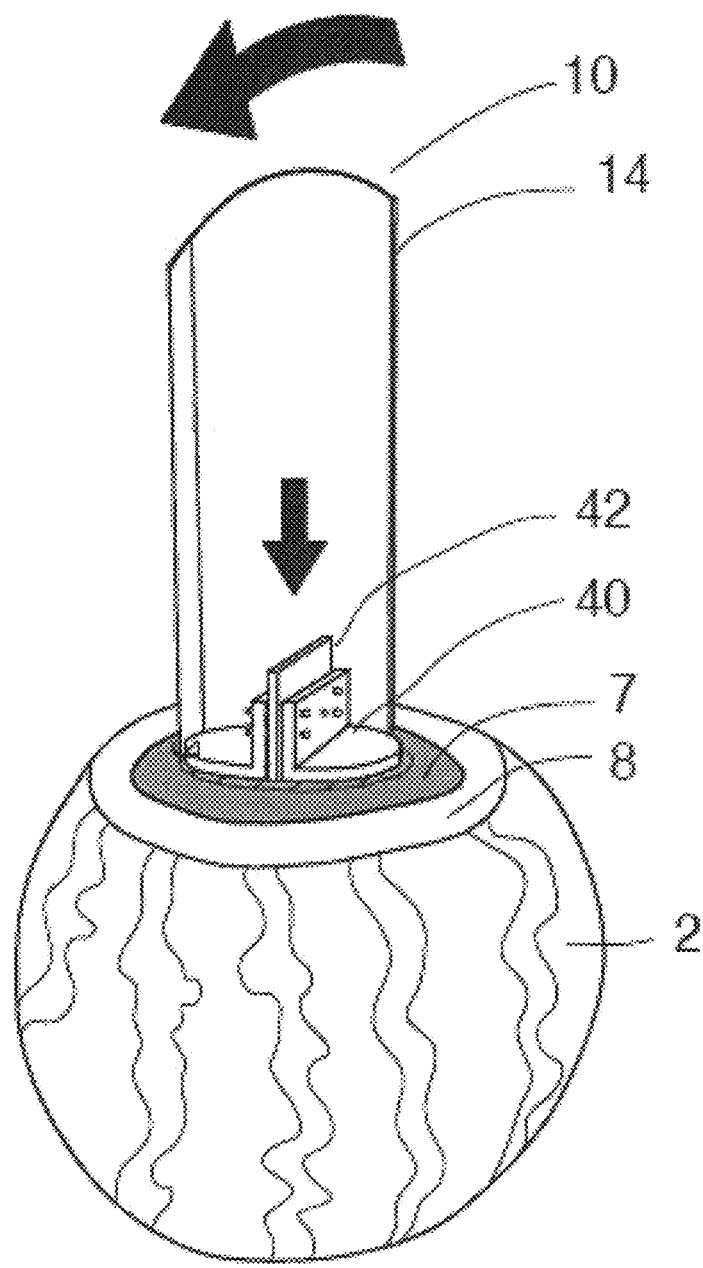
FIG. 4b shows the rotation plate flush against the watermelon with the indexer paddle within the watermelon while the slicer device is rotated.
Figure 5:
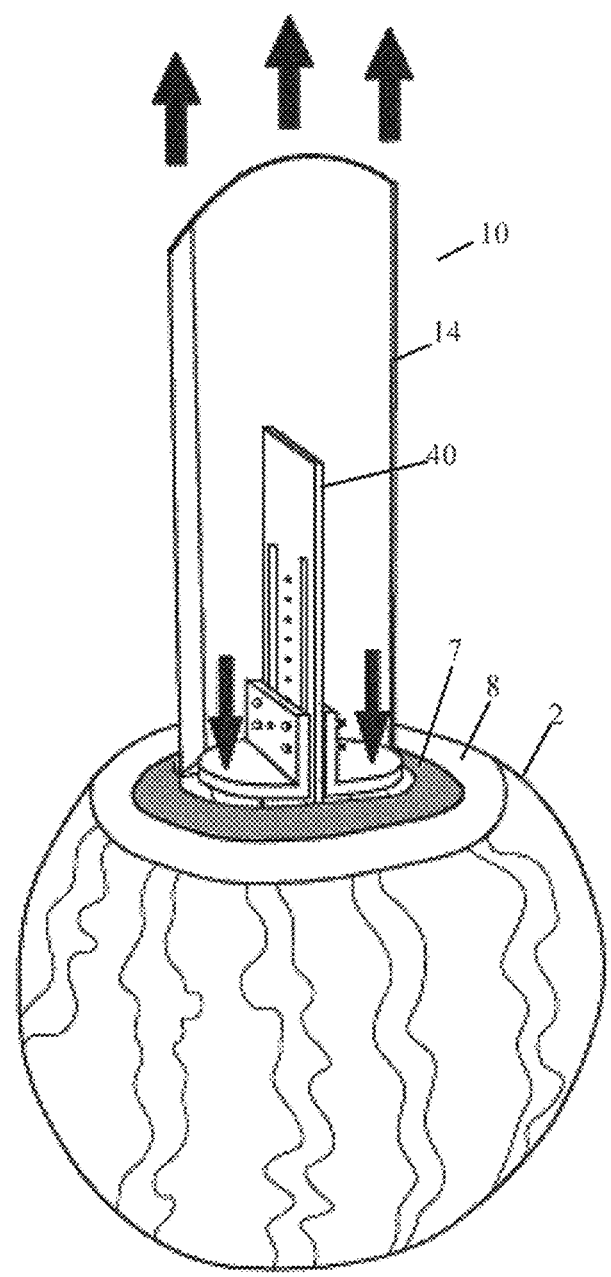
FIG. 5 shows pulling the slicer device with the cutters arranged in parallel being pulled out of the fleshy part of the watermelon and using the rotation plate as a holding device.

In FIG. 4B, the indexer paddle 42 is in place to prevent the core rotation of the fleshy part or meat 7 of the watermelon 2 when the slicer 10 is rotated. The user then rotates the slicer device 10 approximately 90 degrees to separate the fleshy part or meat 7 of the watermelon 2 from the rind 8. The user then retracts the indexer paddle 42, but continues to hold the rotation plate 60 against the surface of the fleshy part or meat 7 of the watermelon 2. The slicer device 10 is then pulled outwards from the fleshy part or meat 7 of the watermelon 2 while the rotation plate 60 is held against the fleshy part or meat 7 until the slicer grid 22 makes contact with the bottom of the rotation plate 60 as shown in FIG. 5. The slicer device 10 with the device 40 including the rotation plate 60 and indexer paddle 42 is now removed completely from the watermelon 2, while the meat 7 of the watermelon 2 remains within the watermelon 2 as shown in FIG. 6.

FIGS. 18A-18L show another method of using the device 40 with a slicer device 10 with wires or cutters 22 arranged in parallel of FIGS. 1-6 to remove the fleshy interior part or meat 7 of the watermelon 2 from the rind or outer portion 8 of the watermelon 2 and cutting the meat 7 into cubes, rather than logs as in FIGS. 11A-11D.

Figure 18A:
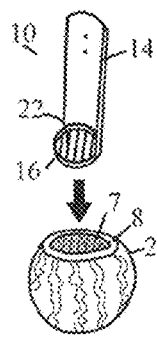
FIGS. 18A-18L shows a sequence of using a slicer with cutters arranged in parallel with a rotation plate including an indexer.
Figure 18B:
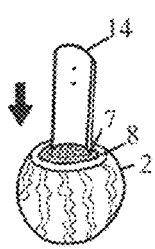
Figure 18C:
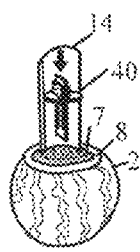
Figure 18D:
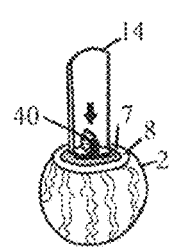

In a first step, the user removes a top crown of the watermelon. The user then aligns the cutter piece 16 of the slicer device 10 with the fleshy part or meat 7 of the watermelon 2 as shown in FIG. 18A. The user then pushes the slicer device 10 down into the watermelon 2 using the support bar 14 or handle 19 as shown in FIG. 18B until the cutter piece 16 reaches a bottom or end of the fleshy part of the watermelon or the user can feel resistance against the firmer internal part of the watermelon rind 8. This action is a straight linear action. The user then aligns the device 40 above the fleshy part 7 of the watermelon 2 as shown in FIG. 18C. It should be noted that the indexer paddle 42 needs to be placed such that it will not interfere with the wire cutters 22 of the slicer device 10. The device 40 is preferably placed within the fleshy part 7 of the watermelon 2 in a position in which the spring biased pin 56 is engaged with one of the central holes 44 close to one end of the indexer paddle 42, for example as shown in FIG. 17. The user then inserts or pushes the indexer paddle 42 into the fleshy part 7 of the watermelon 2 as shown in FIG. 18D such that the bottom surface 50a, 50b of the rotation plate 60 engages the fleshy part 7 of the watermelon 2.

Figure 18E:
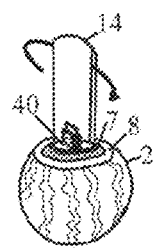
Figure 18F:
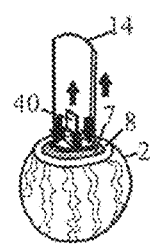

Once the indexer paddle 42 of the device 40 and the slicer device 10 have been inserted into the fleshy part 7 of the watermelon 2, the user rotates the slicer device 10 in a clockwise or counterclockwise direction between 90 degrees, while holding the rotation plate stationary 60 as shown in FIG. 18E. Next, the slicer device 10 and the indexer paddle 42 are slightly lifted a specific distance to a first level from the bottom of the watermelon 2 outwards from the watermelon 2. This distance may be equivalent to the spring biased pin 56 engaging another hole or two holes 44 on the indexer paddle 42. It should be noted that the rotation plate 60 is not moved during movement of the indexer plate 42 as shown in FIG. 18F. The user then rotates the slicer device 10 in a direction opposite of FIG. 18E (either counterclockwise or clockwise) approximately 180 degrees or in the same direction of FIG. 18E, while holding the rotation plate 60 stationary as shown in FIG. 18G.

Figure 18G:
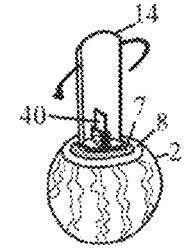
Figure 18H:
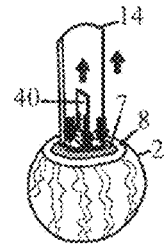
Figure 18I:
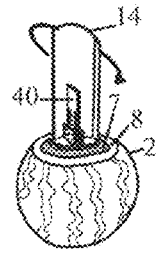
Figure 18J:
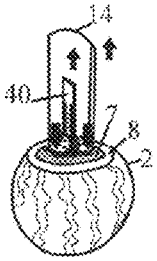
Figure 18K:
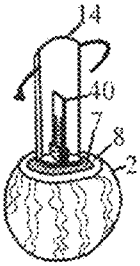
Figure 18L:
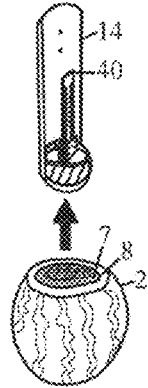

The user can continue to lift the slicer device 10 and the indexer paddle 42 slightly by ratcheting the indexer paddle 42 outwards from the watermelon through the engagement and disengagement of the spring biased pin 56 as shown in FIG. 18H to another level and rotating the slicer device 10 in a first direction as shown in FIGS. 18I and 18E, raise the slicer device 10 and the indexer paddle 42 slightly by ratcheting the indexer paddle 42 outwards from the watermelon 2, while keeping the rotation plate 60 stationary as shown in FIGS. 18F, 18H, and 18J and rotate the slicer device 10 in a direction either the same as shown in FIGS. 18G and K or an opposite direction as shown in FIGS. 18G and 18K. Finally, the slicer device 10 and the device 40 are removed from the watermelon 2 completely, leaving the fleshy part 7 of the watermelon 2 sliced horizontally and vertically within the rind 8. The spacing of the horizontal slices is equivalent in length to the distance the indexer 42 travels before the slicer device 10 is rotated and the size of the openings 24 made by the cutters 22 of the slicer device 10. The watermelon 2 may be served this way within the rind 8 as shown in FIG. 18L or the fleshy part 7 of the watermelon 2 removed by turning the watermelon 2 upside down or scooping out the contents.

Figure 11A:
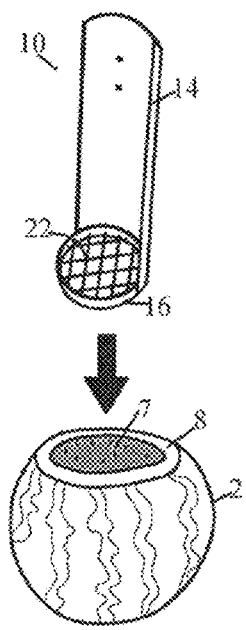
FIGS. 11A-11D show a sequence of using a slicer with cutters arranged in a grid.
Figure 11B:
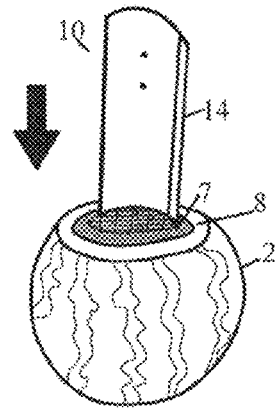
Figure 11C:
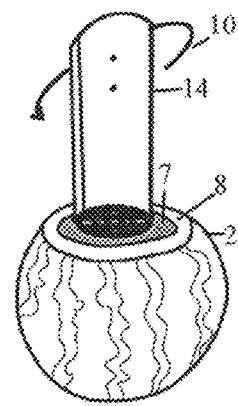
Figure 11D:
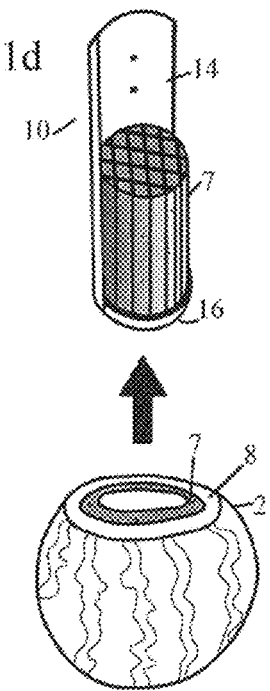

FIGS. 11A-11D show alternate steps of using the slicer device 10 with the cutters or wires 22 arranged in a grid to remove the fleshy interior part or meat 7 of the watermelon 2 from the rind or outer portion 8 of the watermelon 2. In a first step, the user removes a top crown portion from the watermelon 2. The user then aligns the cutter piece 16 of the slicer device 10 with the fleshy part or meat 7 of the watermelon 2 as shown in FIG. 11A. The user then pushes the slicer device 10 down into the watermelon 2 using the support bar 14 or additional handle 19 as shown in FIG. 11B until the cutter piece 16 reaches a bottom or end of the fleshy part of the watermelon 2 and the user can feel resistance against the firmer internal part of the watermelon rind 8. This action is a straight linear action. The user then rotates the slicer device 10 between approximately 90 degrees to 180 degrees to separate the fleshy part or meat 7 of the watermelon 2 from the rind 8 as shown in FIG. 11C. The slicer device 10 is then pulled outwards from the watermelon 2 with the fleshy part 7 of the watermelon 2 as shown in FIG. 11D cut into logs. The inner surface 15 of the support bar 14 is curved and may be used to transfer the removed fleshy part of the meat 7 of the watermelon to another bowl, tray etc.

FIGS. 12-16 show an alternate slicer device 100 with at least one end of at least one wire cutter engaged with a wire tensioning and attachment mechanism. The slicer device 100 has a cutter piece 16 with an outer surface 18 and an inner surface 20. The cutter piece 16 has a height H. Attached to the inner surface 20 of the cutter piece 16 is at least one cutter, for example at least one wire 22 with a cutting edge 17.

As shown in FIG. 12, the at least one wire 22 is arranged within the inner surface 20 of the cutter piece 16 to define openings 24 between the wires 22. The pattern of openings 24 and the at least one wire 22 is not limited to the patterns shown. The at least one wire 22 may be threaded through holes 21 or slots in the cutter piece 16 and may be arranged in parallel as shown in FIGS. 1-6 or in a grid as shown in FIGS. 8 and 12. It should be noted that the shape of the openings 24 defines the shape into which the watermelon meat or flesh 7 will be sliced. The at least one wire 22 may also be arranged into geometric shape symbols, or decorative shapes (e.g. animals, logos, or figures).

At least one support bar 30 is attached to an outer surface 18 of the cutter piece 16. At least one cross handle 12 may attach to the support bars 30 to provide an increased surface area in which to push the slicer device 100 through the meat 7 of the watermelon 2 and ease the overall use of the slicer device 100.

The at least one wire 22 of the slicer device 100 is threaded through the slots or holes 21 or slots within the cutter piece 16 with at least one of the ends of the wire 22 engaged with a wire tensioning and attachment mechanism 33. While the wire tensioning and attachment mechanism 33 is shown with the slicer device 100, the wire tensioning and attachment mechanism 33 may be used with the slicer device 10 of FIGS. 1-11D. The wire tensioning and attachment mechanism 33 may be attached to inner or outer surfaces 13, 15 of the support bar 14.

Figure 13:
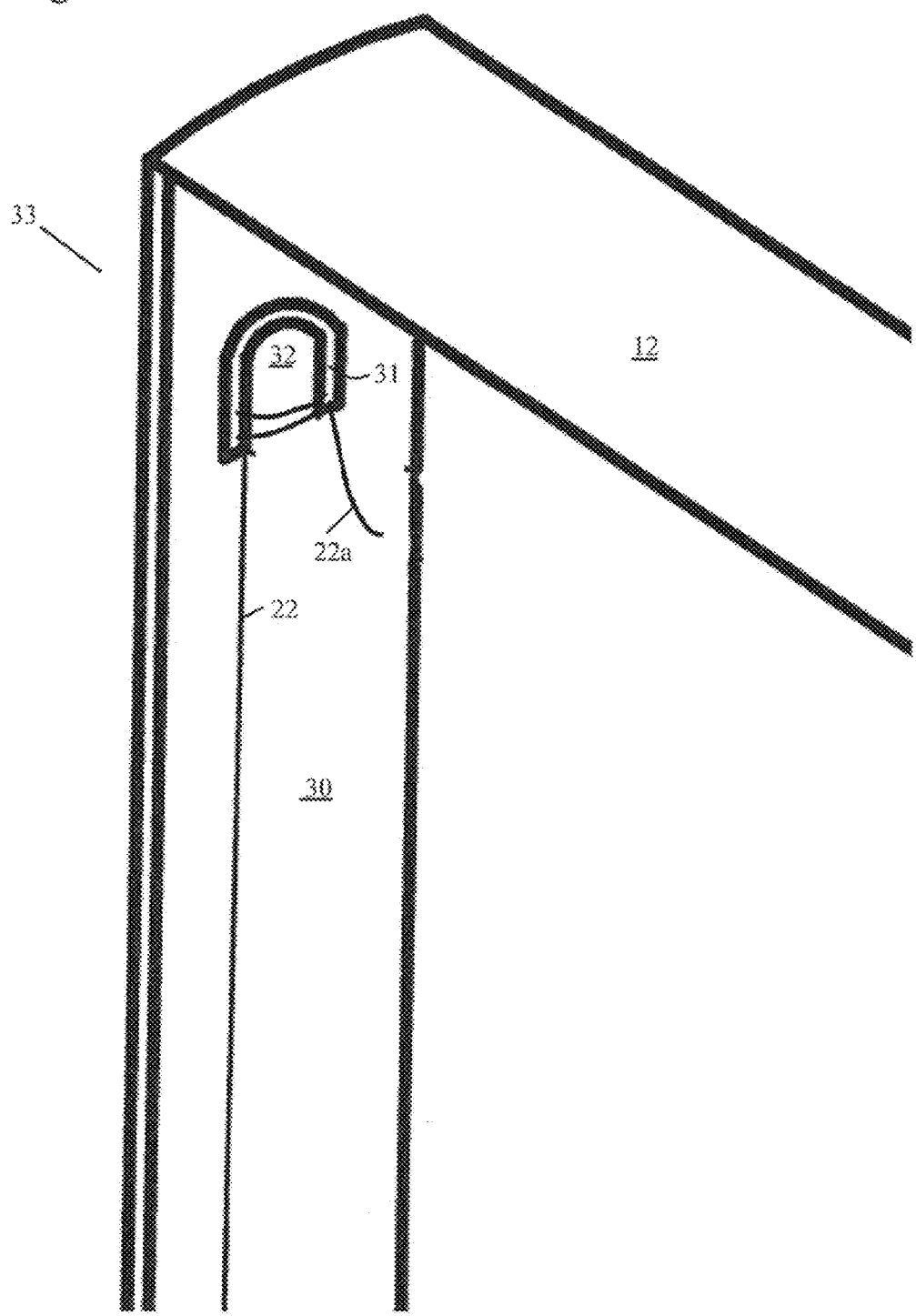
FIG. 13 shows a close-up of the slot wire tensioning mechanism.

In one embodiment shown in FIG. 12, the wire tensioning and attachment mechanism 33 is a tab 32 defining a slot 31 on a surface of the at least one support bar 30. A first end 22a of the wire 22 is threaded through the slots or holes 21 of the cutter piece 16 and is pulled tight, so no slack is present, and the first end 22a of the wire 22 is received within the slot 31 formed by the tab 32 on the support bar 30 and wrapped around the tab 32 and secured to itself as shown in FIG. 13. The second end 22b (not shown) of the wire 22 may be anchored to the cutter piece 16 or received within another slot 31 and wrapped around a tab 32 on the other support bar 30. The wire 22 may be replaced by removing the wire 22 from the slot and wrapped around the tab 32 and rewrapping the wire around the tab or retightened by rewrapping the wire 22 if it were to gain slack.

Figure 14:
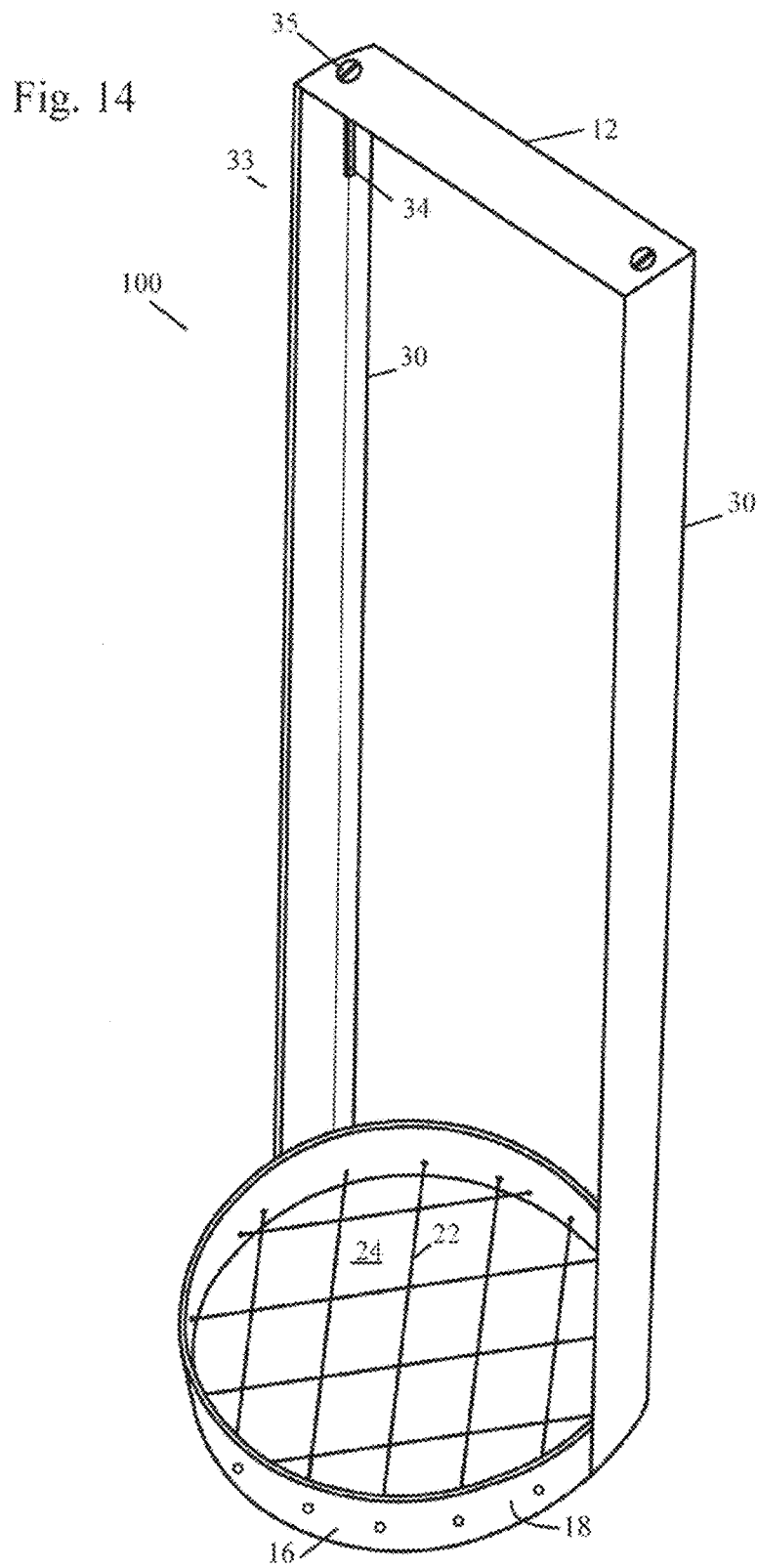
FIG. 14 shows a slicer device with a wire tensioning mechanism of a screw tightener.
Figure 15:
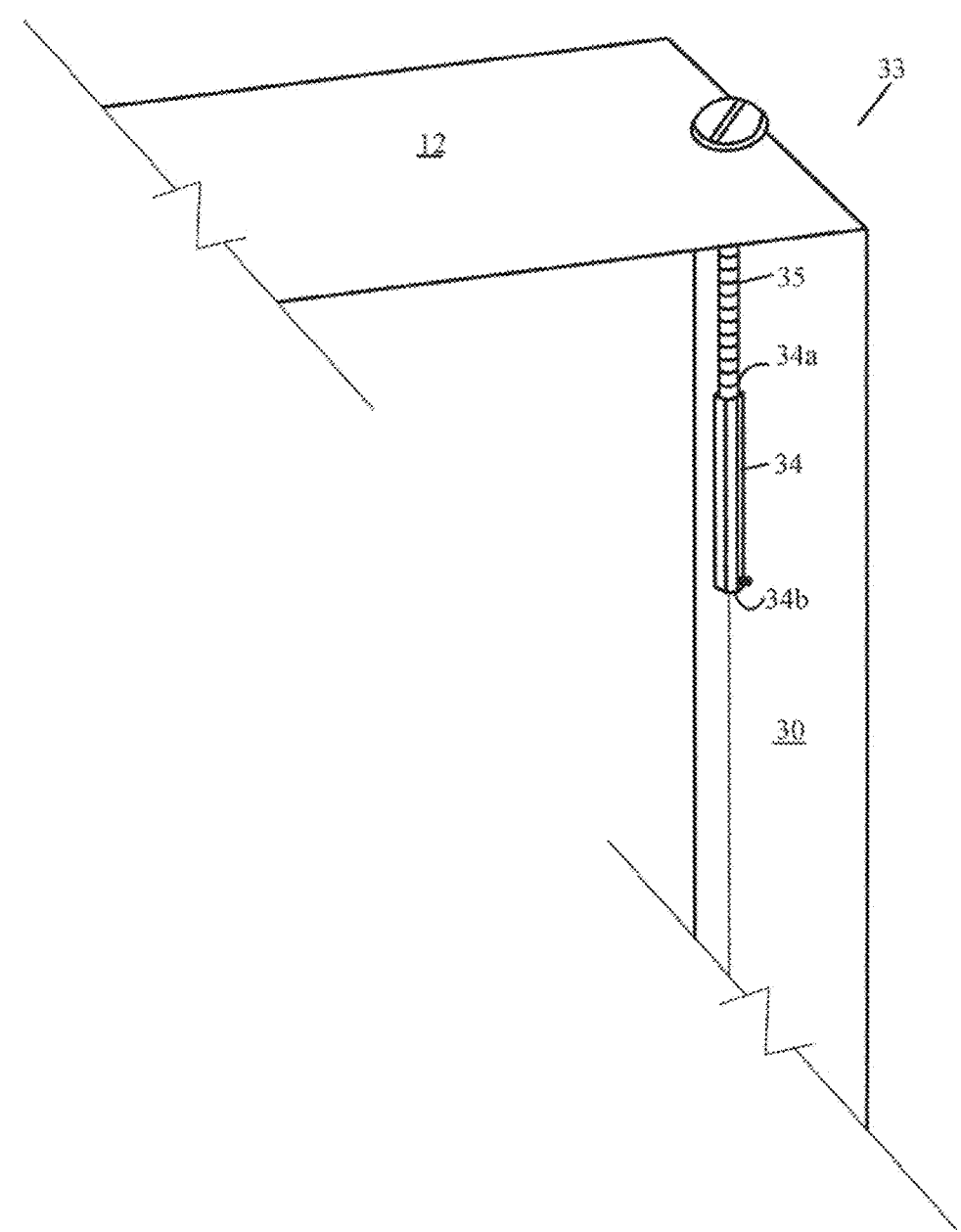
FIG. 15 shows a close-up of the screw tightener wire tensioning mechanism.

Alternatively, the wire tensioning and attachment mechanism 33 is a threaded screw 35 and a coupling nut 34 as shown in FIGS. 14-15. The threaded screw 35 is received within a handle 12 of the slicer device 100 adjacent a support bar 30. The first end 22a of the wire 22 is threaded through the slots or holes 21 of the cutter piece 16 and is pulled tight, so no slack is present, and the first end 22a of the wire 22 is received in a first end 34a of a coupling nut 34 and a threaded screw 35 is received within the second end 34b of the coupling nut 34. The tightening of the screw 35 holds the wire 22 in place and maintains the tautness of the wire 22. The wire 22 may be replaced by loosening the threaded screw 35 and removing it from the coupling nut 34. The wire 22 may be further tightened during as necessary by further tightening the screw 35 to remove any slack from the wire 22. The second end 22b (not shown) of the wire 22 may be anchored to the cutter piece 16 or received within another coupling nut 34 and threaded screw 35 on the other support bar 30.

Figure 16:
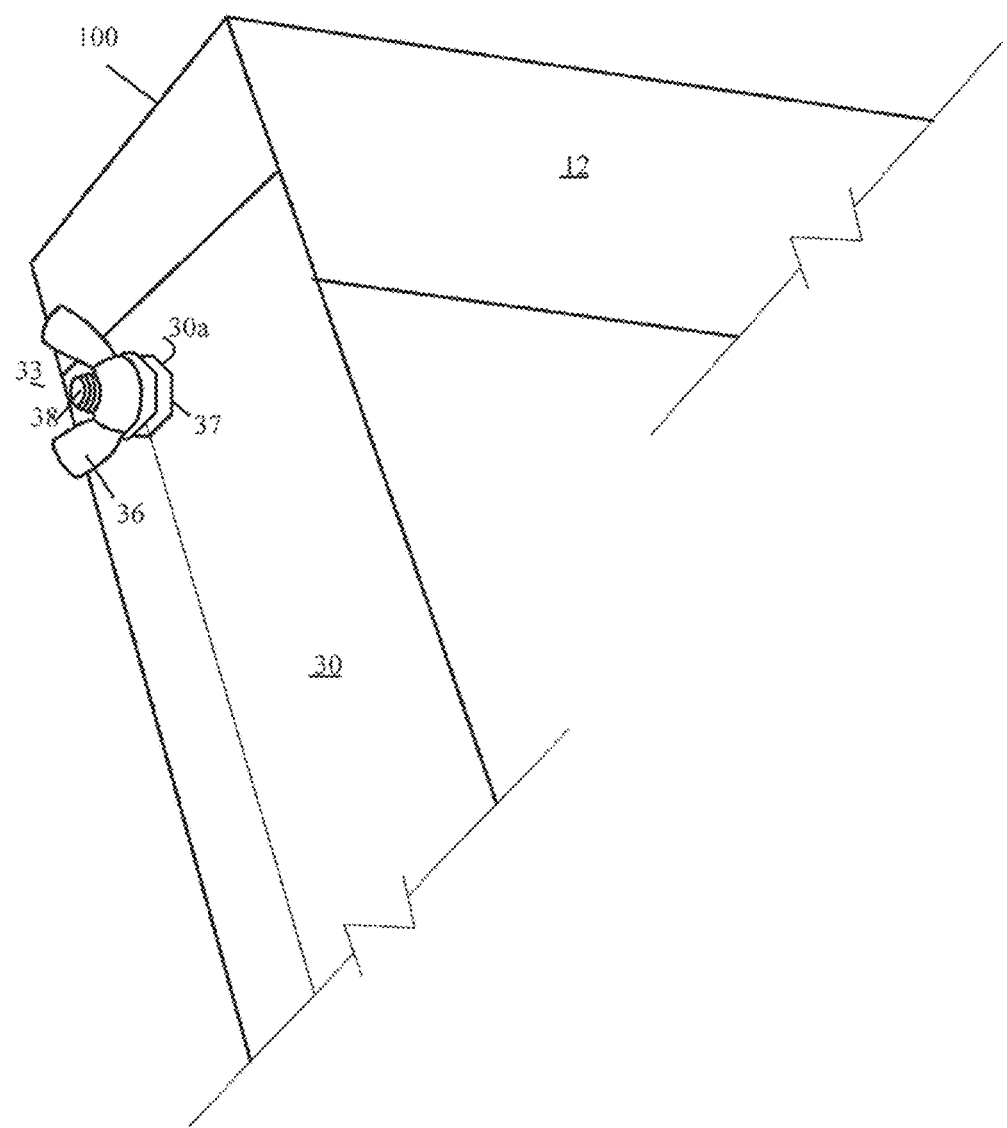
FIG. 16 shows a close-up of a wing nut wire tensioning mechanism.

In another alternate embodiment, the wire tensioning and attachment mechanism 33 is a threaded shaft 38, a nut or washer 37, and a wingnut 36 as shown in FIG. 16. The threaded shaft 38 is received within a hole 30a of the support bar 30 of the slicer device 100. The first end 22a of the wire 22 is threaded through the slots or holes 21 of the cutter piece 16 and is pulled tight, so no slack is present, and the first end 22a of the wire 22 is received wrapped around the threaded shaft 38. A wingnut 36 is then received by the threaded shaft 38 and is screwed down to compress and stabilize the wire 22 around the threaded shaft 38. A nut or washer 37 may be placed between the wingnut 36 and the support bar 30. The tightening of the wingnut 36 holds the wire in place and maintains the tautness of the wire 22. The wire 22 may be replaced by loosening the wingnut 36 and/or removing the wingnut 36 from the threaded shaft 38. The wire 22 may be further tightened as necessary by further tightening the wingnut 36 to remove any slack from the wire 22. The second end 22b (not shown) of the wire 22 may be anchored to the cutter piece 16 or wrapped around another threaded shaft 38 and secured by the wingnut 36 on the other support bar 30.

Figure 19A:
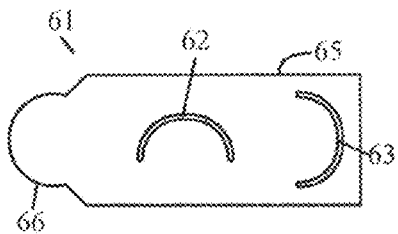
FIGS. 19A-19B show a slicer wrench accessory.
Figure 19B:
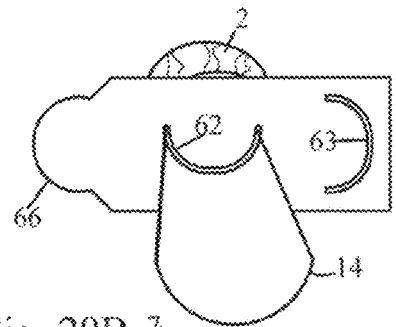

FIGS. 19A and 19B show a slicer wrench 61 that may be used with the slicer device 10 of the present invention. The slicer wrench 61 has a body with a first side 64 and a second side 65 with a first semi-circular cutout 62 that extends from the first side 64 to the second side 65 and a second semi-circular cutout 63 that extends from the first side 64 to the second side 65. The second semi-circular cutout 63 is positioned 90 degrees from the position of the first semi-circular cutout 62. The slicer wrench also has a handle portion 66, which is contoured to conform with the inner surface curve of the support bar 14 of the slice device 10. The first or second semi-circular cutouts 62, 63 may receive the support bar 14 of the slicer device 10 when the slicer device is in the fleshy part 7 of the 12 watermelon as shown in FIG. 19B and may be used to aid the user in rotating the slicer device 10 within the watermelon 2.

Figure 20A:
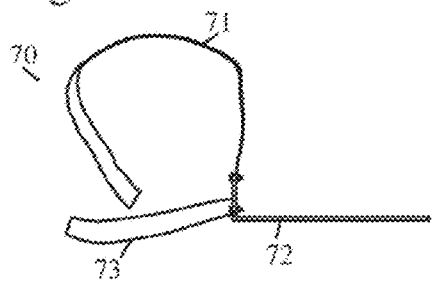
FIGS. 20A-20B show a slicer strap accessory.
Figure 20B:
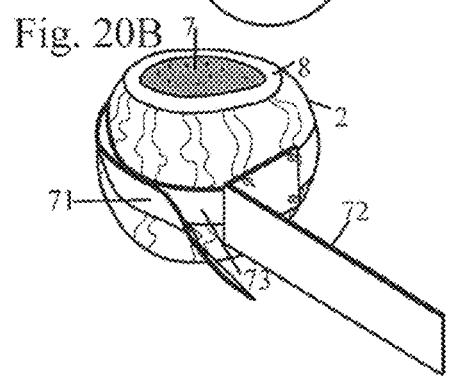

FIGS. 20A and 20B show a slicer strap 70 that may be used with the slicer devices 10, 100 of the present invention. The slicer strap 70 includes a first strap 71 and a second strap 73 attached to an anchor 72. The slicer strap would be placed around an outer circumference of the watermelon 2 and the first and second strap 71, 73 secured to each other through a fastener, for example hook and loop fastener, buckle, etc. . . . . The slicer strap 70 can then be used to secure the watermelon 2 in place, so it will not roll or slip for a user to use the slicer devices 10, 100 of the present invention.

Figure 21A:
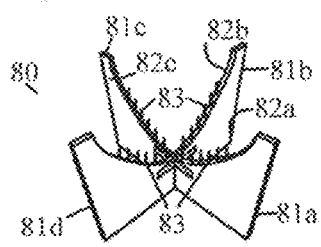
FIGS. 21A-21B show melon holder accessory.
Figure 21B:
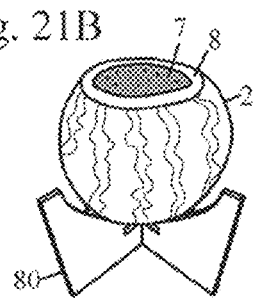

FIGS. 21A and 21B shows a melon holder for use with the slicer devices 10, 100 of the present invention. The melon holder 80 has four plates 81a, 81b, 81c, 81d that are fastened to each other at right angles. Each of the four plates 81a, 81b, 81c, 81d has a curved portion 82a, 82b, 82c, 82d with pegs 83 extending outward therefrom. A watermelon 2 can be placed on the pegs 83 of the curved portions of the four plates 81a, 81b, 81c, 81d to secure the watermelon 2 into place and prevent it from rolling when being used with a slicer device 10, 100. The pegs 83 may have a sharpened end and may be made of metal or plastic. When the watermelon 2 is placed on the pegs 83, the pegs 83 may puncture the outer rind 8 of the watermelon 2.

Figure 22A:
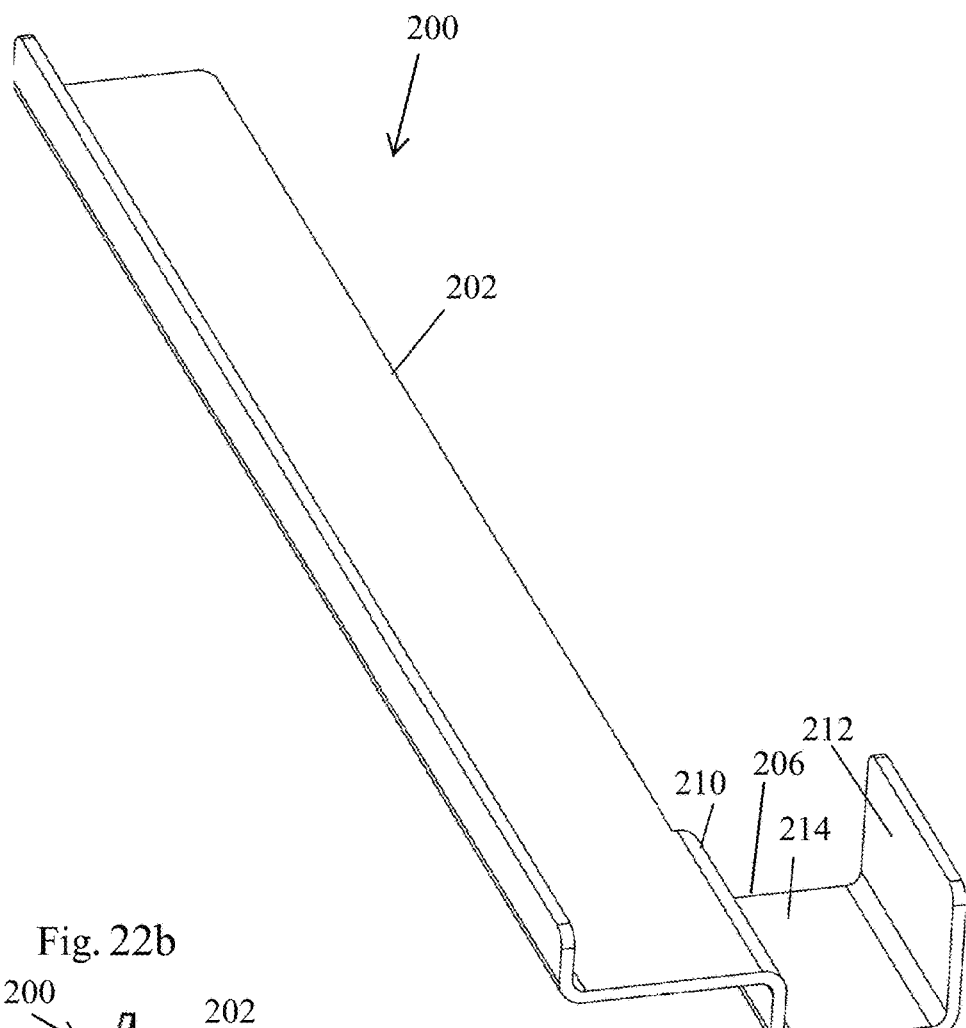
FIGS. 22a and 22b shows a scraper in an embodiment of the present invention.
Figure 22B:
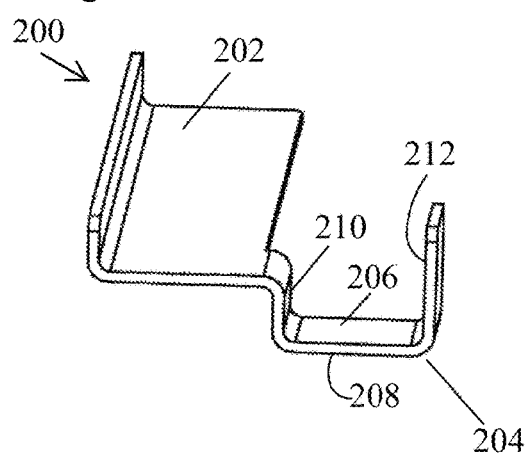
Figure 23:
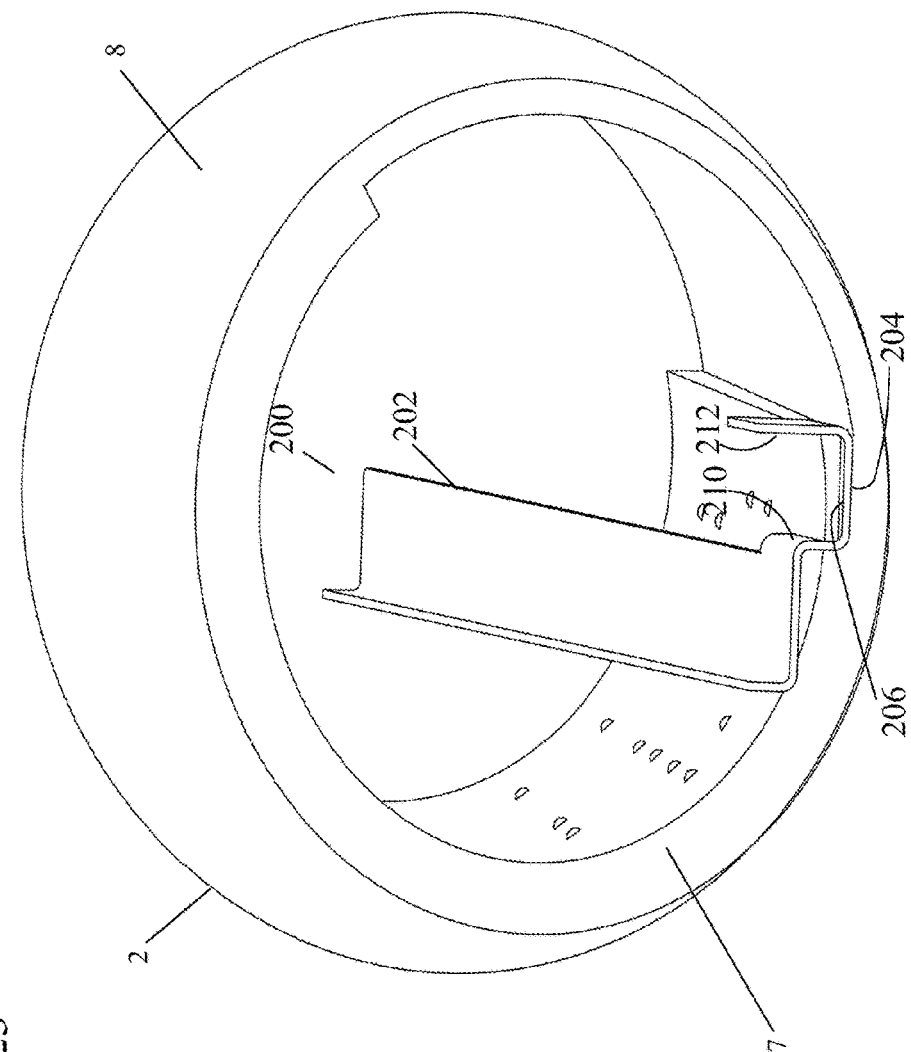
FIG. 23 shows a scraper being used to remove the fleshy part of the watermelon from the rind after the slicer device has been used if there is any remaining melon to harvest.
Figure 26:
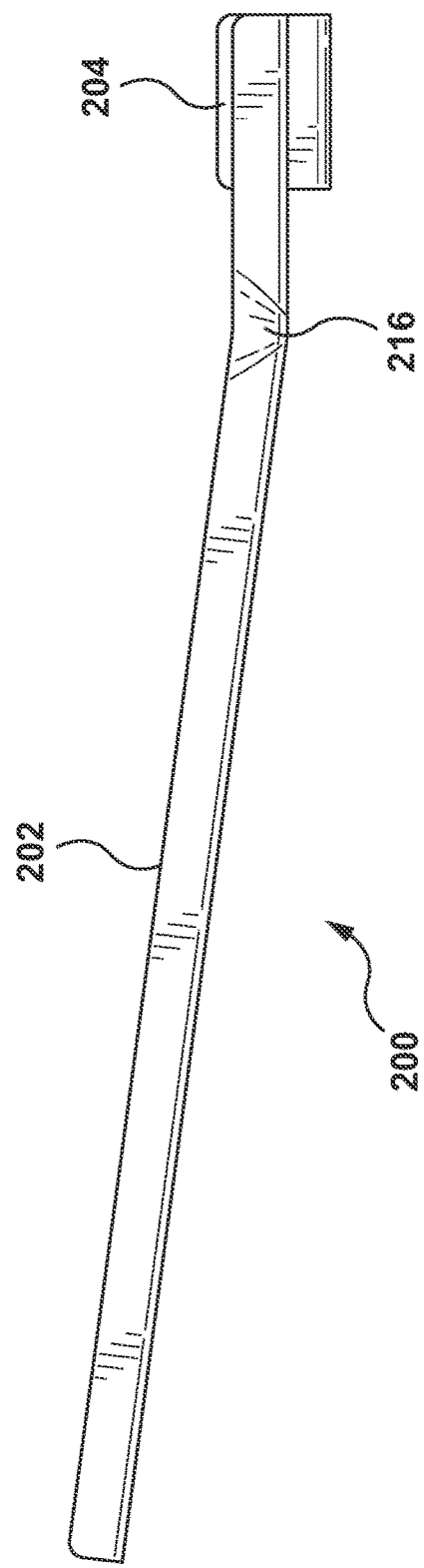
FIG. 26 shows an alternative embodiment of the scraper of FIGS. 22a and 22b.

FIGS. 22a, 22b and 23 show a scraper 200 of a first embodiment that may be used after the slicer device 10 has been pushed through the fleshy part 7 of the watermelon 2 and the pieces removed from the slicer device 10, for example from the watermelon 2 shown in FIG. 11d. The scraper 200 has a handle 202 which is integrally formed with a bent scraping portion 204. The bent scraping portion 204 has a bottom surface 208, a top surface 214 with an edge 206, and opposing wall surfaces 210, 212. In an alternate embodiment, the handle 202 may be bent 216 at an angle relative to the bent scraping portion 204 to permit the user to more easily follow the contour of the watermelon 2 while scraping the fleshy interior 7 of the watermelon 2 as shown in FIG. 26.

To remove the remaining fleshy part 7 of the watermelon 2 after the slicer device 10 has been used, a user aligns an edge 206 of the bent scraping portion 204 with the fleshy part 7 of the watermelon 2 and pulls the scraper 200, such that the edge 206 cuts through the fleshy part 7 of the watermelon 2 from the rind 8 as shown in FIG. 23. The fleshy part 7 of the watermelon 2 that is cut or scraped off, slides across the top surface 214 of the bent scraping portion 204 and is cut into shaped pieces based on the placement of the opposing wall surfaces 210, 212 relative to the top surface 204 of the bent scraping portion 204.

Figure 24:
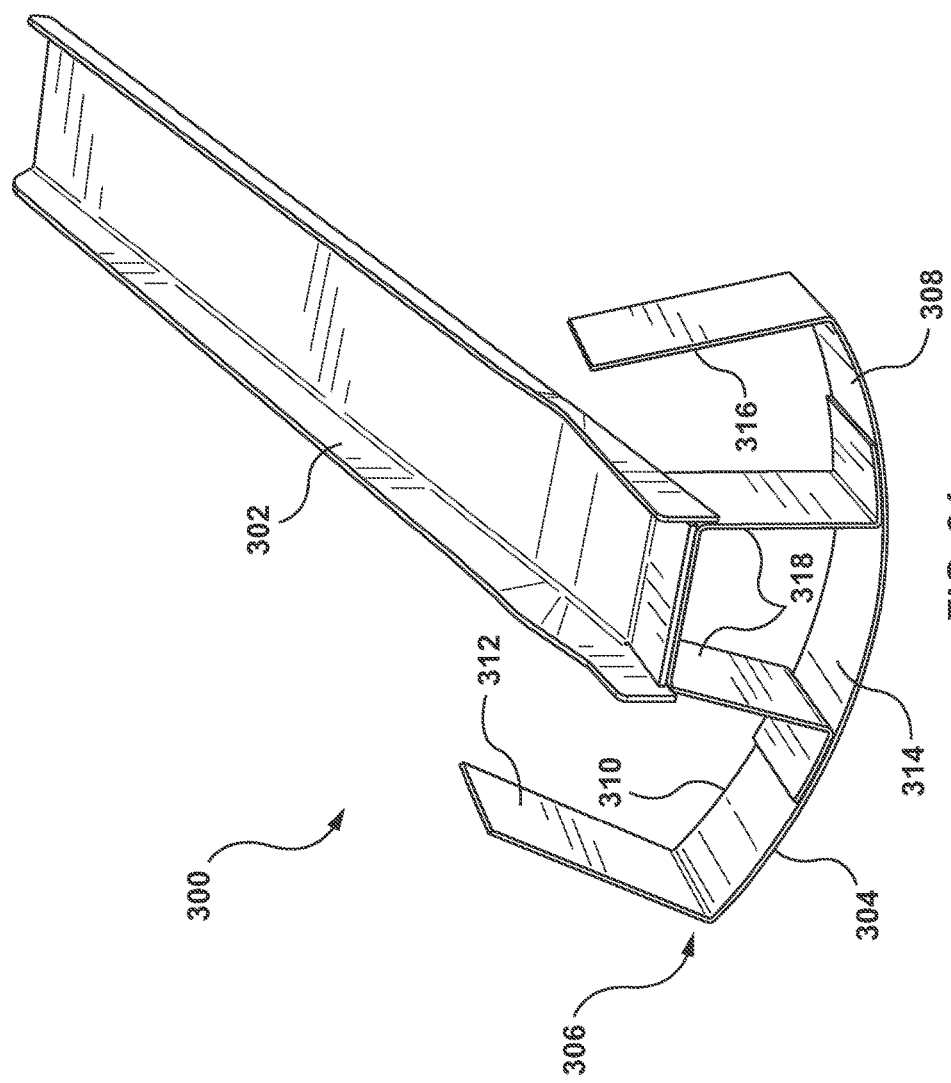
FIGS. 24-25 shows a scraper of an alternative embodiment.
Figure 25:
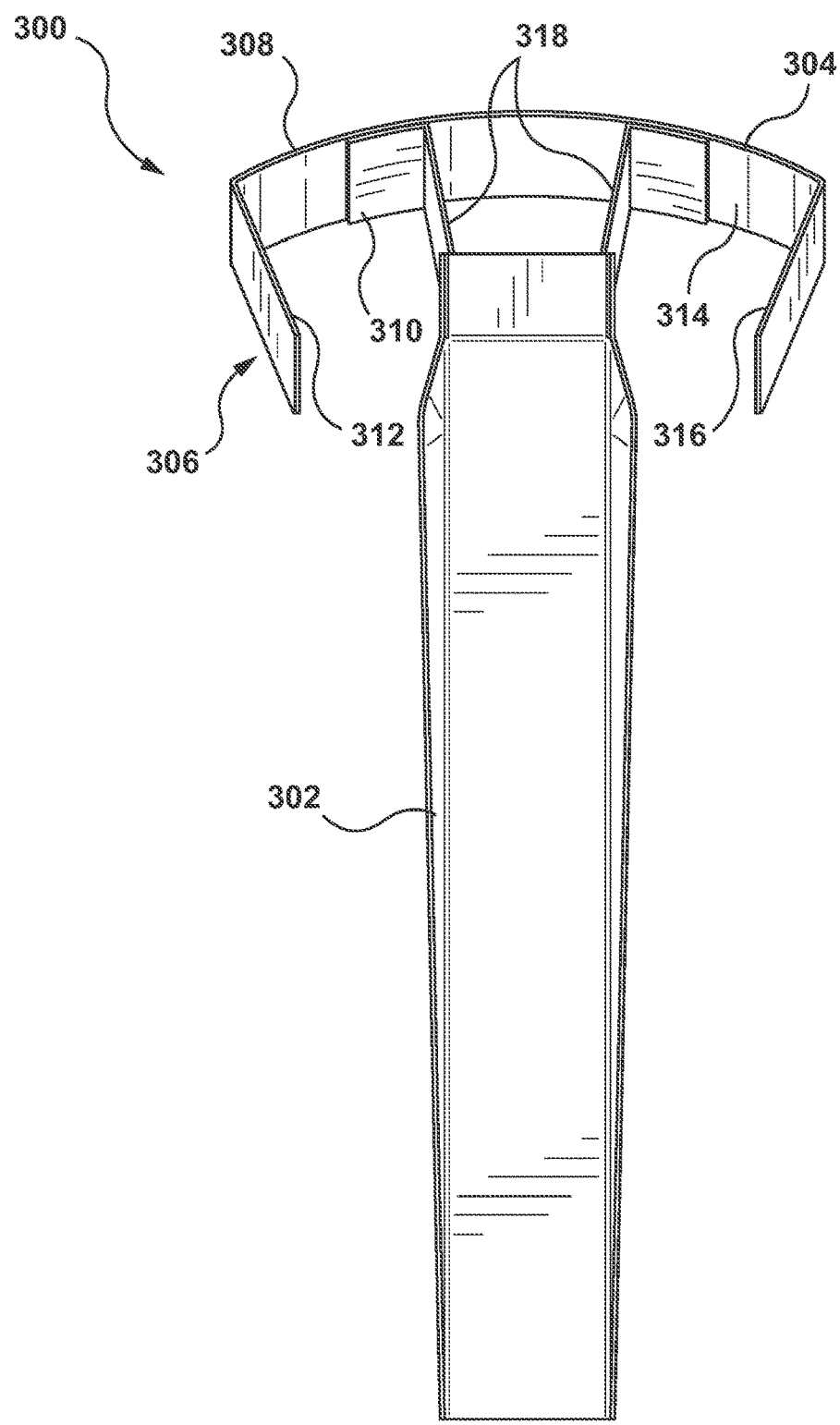

FIGS. 24-25 show a scraper 300 of an alternative embodiment. The scraper 300 may be used after the slicer device 10 has been pushed through the fleshy part 7 of the watermelon 2 and the slicer 10 with melon pieces has been removed from the melon, for example from the watermelon 2 shown in FIG. 11d. The scraper 300 has a handle 302 which is coupled to a scraper head 306 through a connecting portion 318. The scraper head 306 has a scraping portion 308 with a top surface 314, a bottom surface 304 and opposing wall surfaces 312, 316. The scraping portion 308 has an edge 310. The scraper head 306 may be attached to the handle 302 or the handle 302 may be bent at an angle to permit the user to more easily follow the contour of the watermelon 2 while scraping the fleshy interior 7 of the watermelon 2.

To remove the remaining fleshy part 7 of the watermelon 2 after the slicer device 10 has been used, a user aligns the edge 310 of the scraper head 306 with the fleshy part 7 of the watermelon 2 and pulls the scraper 300, such that the edge 310 cuts through the fleshy part 7 of the watermelon 2 from the rind 8 in a manner similar to FIG. 23. The fleshy part 7 of the watermelon 2 that is cut or scraped off, slides across the top surface 314 of the scraper head 306 and is cut into shaped pieces based on the placement of the opposing wall surfaces 312, 316 and the connecting portion 318 relative to the top surface 314 of the scraper head 306. The bend in the handle 302 allows the user to move easily follow the contour of the rind 8 to remove what fleshy interior 7 of the melon 2 is desired.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A fruit scraping device configured to cut and remove flesh of a fruit attached to the fruit's rind, comprising:
   a handle having a first end and a second end, the handle extending in a first direction;
   a scraper head comprising a curved scraping portion having a top surface, a bottom surface, a first edge, a second edge parallel to the first edge, a first wall surface projecting from the top surface at a first end of the curved scraping portion, and a second wall surface projecting from the top surface at a second end of the curved scraping portion; and
   a connecting portion comprising a first leg and a second leg, wherein the connecting portion extends in a second direction to connect the curved scraping portion to the second end of the handle such that the first leg and the second leg extend from the top surface of the curved scraping portion and are inwardly spaced from the first wall surface and the second wall surface, and the first leg, the second leg, and the top surface of the curved scraping portion at least partially define an aperture therebetween.

2. The fruit scraping device of claim 1, wherein the aperture has an aperture axis that is non-perpendicular to a handle axis.

3. The fruit scraping device of claim 1, wherein the aperture is defined by the first leg, the second leg, the curved scraping portion, and the second end of the handle.

4. The fruit scraping device of claim 1, wherein a portion of the handle is bent at an angle.

5. The fruit scraping device of claim 1, wherein the curved scraping portion has a curve defined by a radius which allows a user to align the edge of the curved scraping portion with the flesh of the fruit remaining attached to the fruit's rind after a fruit cutting device cuts and removes an inner cylinder of the flesh of the fruit.

6. A system for cutting and removing flesh of a fruit from within the fruit's rind, comprising:
   a fruit cutting device configured to cut and remove flesh of the fruit from within the fruit's rind; and
   a fruit scraping device configured to cut and remove flesh of the fruit attached to the fruit's rind, comprising:
      a handle having a first end and a second end, the handle extending in a first direction;
      a scraper head comprising a curved scraping portion having a top surface, a bottom surface, a first edge, a second edge parallel to the first edge, a first wall surface projecting from the top surface at a first end of the curved scraping portion, and a second wall surface projecting from the top surface at a second end of the curved scraping portion; and
      a connecting portion comprising a first leg and a second leg, wherein the connecting portion extends in a second direction to connect the curved scraping portion to the second end of the handle such that the first leg and the second leg extend from the top surface of the curved scraping portion and are inwardly spaced from the first wall surface and the second wall surface, and the first leg, the second leg, and the top surface of the curved scraping portion at least partially define an aperture therebetween.

7. The system of claim 6, wherein the fruit cutting device cuts and removes an inner cylinder of the flesh of the fruit.

8. The system of claim 7, wherein the curved scraping portion has a curve defined by a radius which allows a user to align the edge of the curved scraping portion with the fleshy part of the fruit remaining attached to the fruit's rind after the fruit cutting device cuts and removes the inner cylinder of the fleshy part of the fruit.

9. The system of claim 6, wherein a portion of the handle is bent at an angle.

10. A fruit scraping device configured to cut and remove flesh of a fruit attached to the fruit's rind, comprising:
    a handle having a first end and a second end, the handle extending in a first direction;
    a scraper head comprising a curved scraping portion having a top surface, a bottom surface, a first edge, a second edge parallel to the first edge, a first wall surface projecting from the top surface at a first end of the curved scraping portion, and a second wall surface projecting from the top surface at a second end of the curved scraping portion; and
    at least one leg coupled to the second end of the handle and to the top surface of the curved scraping portion to connect the scraper head to the handle, wherein the at least one leg extends from the top surface of the curved scraping portion in a second direction and the at least one leg is inwardly spaced from the first wall and the second wall surface.

11. The fruit scraping device of claim 10, further comprising an aperture at least partially defined by the at least one leg and the curved scraping portion.

12. The fruit scraping device of claim 1, wherein the first wall surface and the second wall surface project linearly from the top surface of the curved scraping portion at an angle.

13. The system of claim 6, wherein the first wall surface and the second wall surface project linearly from the top surface of the curved scraping portion at an angle.

14. The fruit scraping device of claim 10, wherein the first wall surface and the second wall surface project linearly from the top surface of the curved scraping portion at an angle.

* * * * *